United States Patent
Moore et al.

(10) Patent No.: US 12,017,333 B2
(45) Date of Patent: Jun. 25, 2024

(54) SYSTEM AND METHOD FOR HANDLING A COMPOSITE WORKPIECE IN A WORK CELL

(71) Applicant: The Boeing Company, Chicago, IL (US)

(72) Inventors: Matthew B. Moore, Edmonds, WA (US); Patrick B. Stone, Monroe, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/048,905

(22) Filed: Oct. 24, 2022

(65) Prior Publication Data
US 2023/0134904 A1 May 4, 2023

Related U.S. Application Data

(60) Provisional application No. 63/274,989, filed on Nov. 3, 2021.

(51) Int. Cl.
*B25B 5/14* (2006.01)
*B29C 70/54* (2006.01)
*B29L 31/30* (2006.01)

(52) U.S. Cl.
CPC .............. *B25B 5/14* (2013.01); *B29C 70/54* (2013.01); *B29L 2031/3076* (2013.01)

(58) Field of Classification Search
CPC ......... B25B 5/14; B29C 70/54; B29C 70/545; B29L 2031/3076
See application file for complete search history.

(56) References Cited

U.S. PATENT DOCUMENTS

| | | | |
|---|---|---|---|
| 4,382,728 A | 5/1983 | Anderson et al. |
| 4,486,128 A | 12/1984 | Baker et al. |
| 5,088,609 A | 2/1992 | Fryc |
| 5,817,269 A | 10/1998 | Younie et al. |
| 6,430,796 B1 | 8/2002 | Jones et al. |
| 7,273,333 B2 | 9/2007 | Buttrick et al. |
| 7,334,673 B2 | 2/2008 | Boberg et al. |
| 7,574,933 B2 | 8/2009 | Hazlehurst et al. |
| 8,005,563 B2 | 8/2011 | Cobb et al. |
| 8,606,388 B2 | 12/2013 | Cobb et al. |
| 8,620,470 B2 | 12/2013 | Cobb et al. |
| 8,733,707 B2 | 5/2014 | Stone |
| 9,651,935 B2 | 5/2017 | Stone |
| 9,981,367 B2 | 5/2018 | Nestleroad et al. |

(Continued)

FOREIGN PATENT DOCUMENTS

| | | |
|---|---|---|
| WO | WO 99/46079 | 9/1999 |
| WO | WO 03/037564 | 5/2003 |

OTHER PUBLICATIONS

European Patent Office, Extended European Search Report, App. No. 22200606.6 (Feb. 2, 2023).

*Primary Examiner* — Lawrence Averick
(74) *Attorney, Agent, or Firm* — Walters & Wasylyna LLC

(57) ABSTRACT

A system for handling a composite workpiece includes a work cell and a plurality of workpiece holders to hold a composite workpiece in the work cell. Each one of the plurality of workpiece holders is selectively controlled to index the composite workpiece in the work cell and to conform the composite workpiece to an as-built shape of the composite workpiece.

20 Claims, 18 Drawing Sheets

(56) References Cited

U.S. PATENT DOCUMENTS

| | | |
|---|---|---|
| 10,442,153 B2 | 10/2019 | Shinozaki et al. |
| 10,520,933 B2 | 12/2019 | Stone et al. |
| 10,710,327 B2 | 7/2020 | Butler |
| 10,711,815 B2 | 7/2020 | Chan et al. |
| 10,723,485 B2 | 7/2020 | Moore et al. |
| 10,906,158 B2 | 2/2021 | Newton |
| 10,919,746 B2 | 2/2021 | Harada |
| 11,007,766 B2 | 5/2021 | Bye |
| 2008/0084018 A1 | 4/2008 | Baumann et al. |
| 2014/0090252 A1* | 4/2014 | Sisco ............... B23P 23/00 29/33 R |
| 2014/0325813 A1* | 11/2014 | Batt ............... B64F 5/10 29/283.5 |
| 2019/0084193 A1 | 3/2019 | Riedel |

* cited by examiner

– 1 –

SYSTEM AND METHOD FOR HANDLING A COMPOSITE WORKPIECE IN A WORK CELL

PRIORITY

This application claims priority from U.S. Ser. No. 63/274,989 filed on Nov. 3, 2021.

FIELD

The present disclosure relates generally to composite manufacturing and, more particularly, to systems and methods for handling a composite workpiece in a work cell during a processing operation.

BACKGROUND

Composite parts are commonly used in applications where light weight and high strength are desired, such as in aircraft and vehicles. Typically, one or more machining or other processing operations are performed on the composite part, such as drilling holes, machining features, and trimming edges. However, composite parts, particularly large composite parts, may tend to deform once they are removed from a tool upon which they are cured. Such deformation may present challenges related to the accuracy of the machining operations. As such, post-machining operations, such as shimming and/or additional drilling, may be required due to differences between an as-built shape of the composite structure and a shape of the composite structure during machining. These challenges may also limit the capacity for determinant assembly or predictive assembly of a manufactured structure that includes the composite part. Accordingly, those skilled in the art continue with research and development efforts in the field of composite manufacturing.

SUMMARY

Disclosed are examples of a system for handling a composite workpiece, a workpiece holder for handling a composite workpiece, a method for handling a composite workpiece, and a composite workpiece manufactured using the system and/or according to the method. The following is a non-exhaustive list of examples, which may or may not be claimed, of the subject matter according to the present disclosure.

In a first example, the disclosed system includes a work cell and a plurality of workpiece holders to hold a composite workpiece in the work cell. Each one of the plurality of workpiece holders is selectively controlled to index the composite workpiece in the work cell and to conform the composite workpiece to an as-built shape of the composite workpiece.

In a second example, the disclosed method is for handling a composite workpiece using the system of the first example.

In a third example, the disclosed method is for fabricating a portion of an aircraft using the system of the first example.

In a fourth example, the disclosed composite is manufactured using the system of the first example.

In a fifth example, the disclosed workpiece holder includes a base and a clamp coupled to the base. The clamp includes a first jaw, a support member coupled to the first jaw, and a second jaw coupled to the support member. The second jaw is movable along the support member relative to the first jaw to clamp a composite workpiece between the first jaw and the second jaw so that the composite workpiece conforms to an as-built shape of the composite workpiece. With the composite workpiece clamped between the first jaw and the second jaw, the clamp is movable relative to the base to index the composite workpiece in a work cell.

In a sixth example, the disclosed system includes the workpiece holder of the fifth example.

In a seventh example, the method is for handling a composite workpiece using the workpiece holder of the fifth example.

In an eighth example, the method is for fabricating a portion of an aircraft using the workpiece holder of the fifth example.

In a ninth example, the disclosed method includes steps of: (1) transporting a composite workpiece to a work cell; (2) holding the composite workpiece in the work cell; (3) indexing the composite workpiece in the work cell; and (4) conforming the composite workpiece to an as-built shape of the composite workpiece.

In a tenth example, the disclosed system is implemented according to the method of the ninth example.

In an eleventh example, the disclosed composite workpiece is manufactured according to the method of the ninth example.

In a twelfth example, a portion of an aircraft is assembled according to the method of ninth example.

Other examples of the disclosed system, workpiece holder, method, and composite workpiece will become apparent from the following detailed description, the accompanying drawings, and the appended claims.

DETAILED DESCRIPTION

Referring generally to FIGS. 1-17, by way of examples, the present disclosure is directed to a system 100 for handling a composite workpiece 102. The system 100 facilitates one or more post-cure processing operation, such as at least one machining operation, being performed on the composite workpiece 102. More particularly, the system 100 facilitates automated indexing of the composite workpiece 102 within a work cell and conformance of the composite workpiece 102 to a predetermined or desired shape within the work cell during a post-cure processing operation. As such, the system 100 advantageously improves the accuracy and precision of the machining operation and facilitates determinant assembly and/or predictive assembly of a structure that includes the composite workpiece 102.

Figure 20:
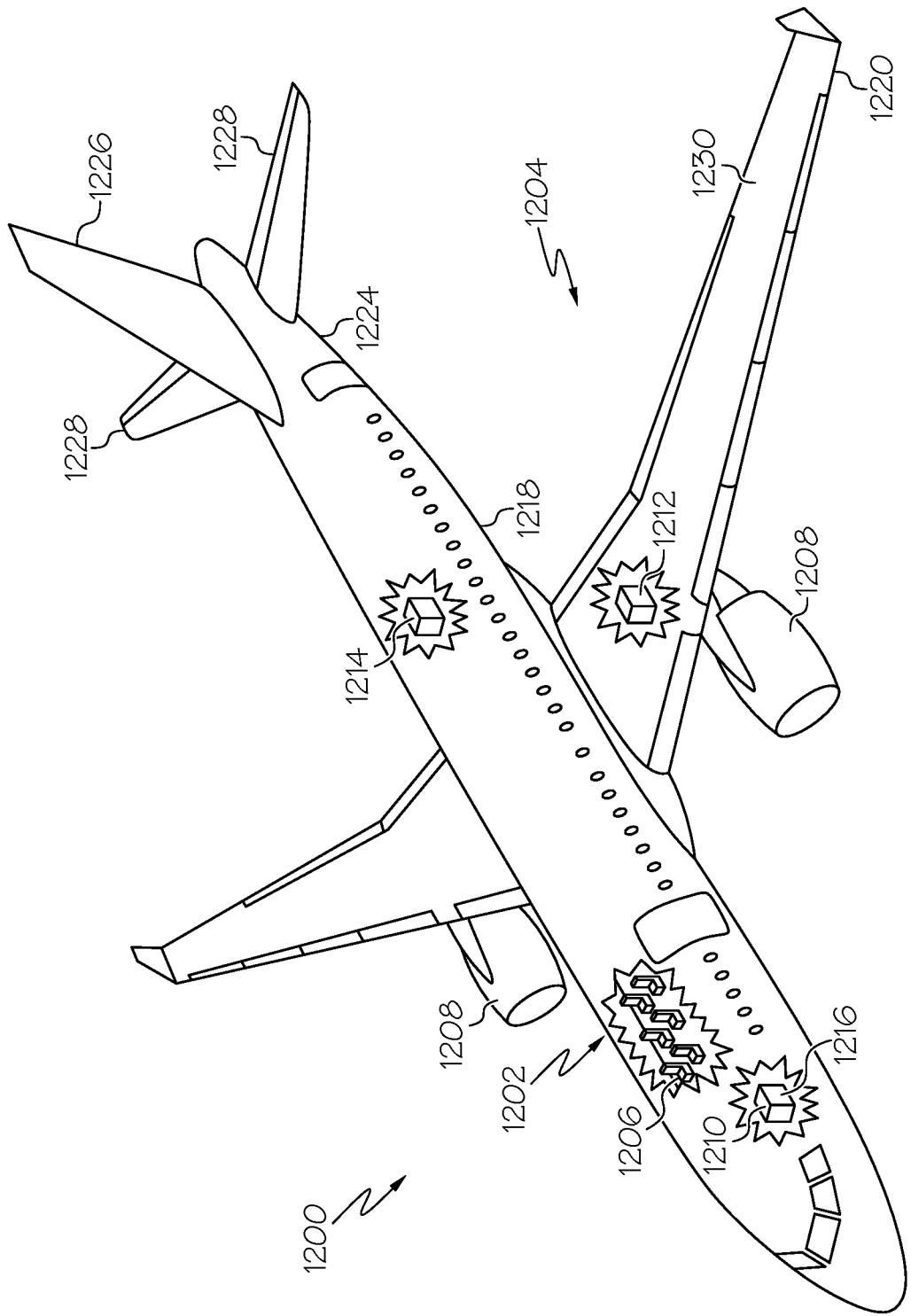
FIG. 20 is a schematic illustration of an example of an aircraft.

For the purpose of the present disclosure, the term "composite workpiece" (e.g., the composite workpiece 102) refers to any object, article, item, or structure made of a cured composite material. In one or more examples, the composite workpiece 102 is, or forms, a part of or a component of a larger manufactured article or structure, such as an aircraft or a component of an aircraft. As an example, the composite workpiece 102 is a wing panel 1230 of an aircraft 1200 (e.g., as shown in FIG. 20).

For the purpose of the present disclosure, the term "post-cure" refers to a condition of a composite material after a curing operation, such as by application of heat and/or pressure, to cure, anneal, dry, and/or harden the composite material.

For the purpose of the present disclosure, the term "as-built," such as in reference to an as-built condition or an as-built shape (e.g., generally referred to herein as an as-built shape 118) of the composite workpiece 102, refers to a condition of the composite workpiece 102 in which the composite workpiece 102 has a shape (e.g., geometry, profile, contour, structural features, and the like) upon a tool in which the composite workpiece 102 was cured (e.g., tool 150). In other words, as an example, the as-built shape 118 of the composite workpiece 102 is a shape of the composite workpiece 102 that is substantially the same as a shape of the composite workpiece 102 as cured on a tool or mandrel (e.g., tool 150) and prior to separation from the tool or mandrel.

For the purpose of the present disclosure, the term "real-time," such as in reference to a real-time condition or a real-time shape (e.g., generally referred to herein as a real-time shape 114) of the composite workpiece 102, refers to an immediate condition of the composite workpiece 102 in which the composite workpiece 102 has a shape (e.g., geometry, profile, contour, structural features, and the like) as presently positioned, such as before or during a post-cure processing operation (e.g., one or more machining operations).

For the purpose of the present disclosure, the term "as-machined," such as in reference to an as-machined condition or an as-machined shape (e.g., generally referred to herein as an as-machined shape 178) of the composite workpiece 102, refers to a post-processing condition of the composite workpiece 102 in which the composite workpiece 102 has a shape (e.g., geometry, profile, contour, structural features, and the like) after a post-cure processing operation (e.g., one or more machining operations) is performed on the composite workpiece 102.

It can be appreciated that a tool upon which a composite workpiece is cured provides a support structure that reinforces a shape of the composite workpiece while the composite workpiece is on the tool. Once a composite workpiece or other composite structure is removed from a tool upon which it is cured, the reinforcement provided by the tool is also removed and the composite structure may tend to change its shape (e.g., droop, sag, bend, twist, deflect, etc.) from its reinforced shape (e.g., as-build shape), as supported by the tool, to an unreinforced shape, as unsupported by the tool, which is different than its reinforced shape. When the tool that provides the reinforcement is removed, the composite workpiece may change shape, for example, due to residual stresses in the composite structure or due to external forces applied to the composite structure during post-cure processing, such as, but not limited to, gravity causing drooping and/or sagging or loads applied to the composite structure by machine tools during processing. The principles and implementations of the system 100 disclosed herein enable a composite workpiece to be maintained in or to be conformed to the as-built shape (e.g., a shape that is substantially the same as the shape of the composite workpiece reinforced by the tool) once the composite workpiece is removed from the tool. As such, a machining operation can be performed on the composite workpiece with the composite workpiece in the as-built shape, thereby, reducing or eliminating inaccurate or inconsistent machining due to the machining operation being performed on a composite workpiece while the composite workpiece has a shape that is different than the as-built shape.

Additionally, the principles and implementations of the system 100 disclosed herein enable a digital model to be generated, which is representative of the composite workpiece having the as-built shape. The digital model of the composite workpiece (e.g., in the as-built shape) may be used to automatically index, for example, under computer control, the composite workpiece before a post-cure processing operation is performed on the composite workpiece. As such, a machining operation performed on the composite workpiece, in the as-built shape and appropriately indexed, improves processing speeds and increases the accuracy of the machining operation being performed on the composite workpiece. For example, the as-built shape will closely correspond to the contour and/or shape of the composite workpiece (e.g., a panel) when the composite workpiece is assembled into final structure (e.g., a wing with ribs and spars).

Further, the digital model of the composite workpiece may also be used to conform the composite workpiece to the as-built shape during a processing operation performed on the composite workpiece. As such, machining operations performed on the composite workpiece, conformed to the as-built shape, reduces or eliminates inaccurate or inconsistent machining due to the machining operation being performed on the composite workpiece while the composite workpiece has a shape that is different than the as-built shape and/or the as-machined shape.

Moreover, the principles and implementations of the system 100 disclosed herein enable the digital model to be updated after a machining operation is performed, such that the digital model is representative of an as-machined shape of the composite workpiece 102. The digital model of the composite workpiece (e.g., in the as-machined shape) may be used to index the composite workpiece before a subsequent post-cure processing operation is performed on the composite workpiece. The digital model of the composite workpiece may also be used to conform the composite workpiece to the as-machined shape during a subsequent post-cure processing operation performed on the composite workpiece. As such, the principles of the system 100 disclosed herein also enable determinant assembly or predictive assembly of the composite workpiece based on the digital model of the composite workpiece, which is updated throughout post-cure processing of the composite workpiece.

Figure 1:
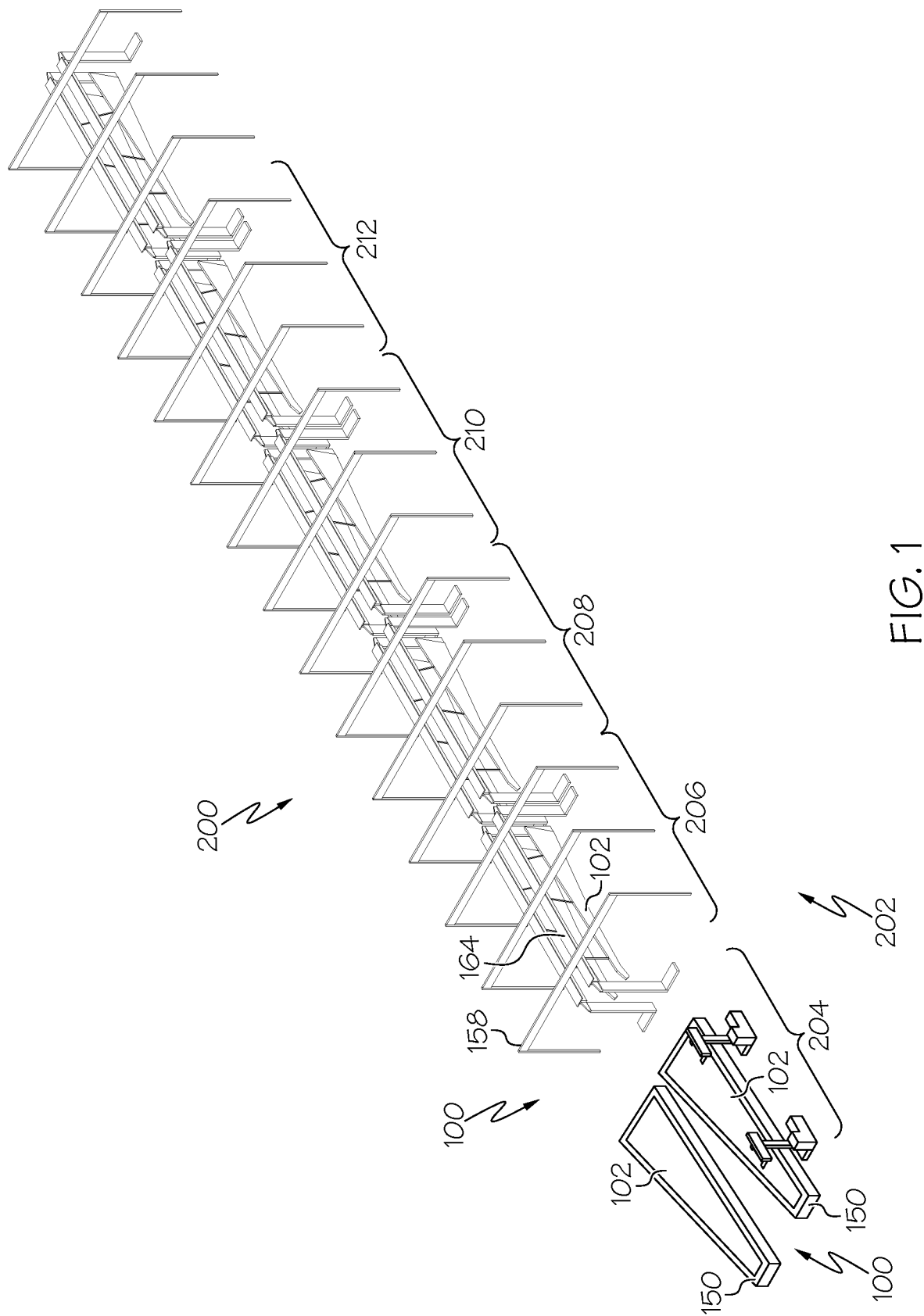
FIG. 1 is a schematic illustration of an example of a manufacturing environment for post-cure processing of a composite workpiece.

Referring now to FIG. 1, which schematically illustrates a manufacturing environment 200. The manufacturing environment 200 facilitates post-cure processing of the composite workpiece 102, such as machining, trimming, coating, painting, sub-assembly (e.g., assembly of other parts or components to the composite workpiece 102), and the like. Generally, the manufacturing environment 200 includes a plurality of work cells 202, identified individually as a first work cell 204, a second work cell 206, a third work cell 208, a fourth work cell 210, a fifth work cell 212, etc. Each one of the work cells 202 facilitates or corresponds to a different post-cure processing operation associated with the manufacture of the composite workpiece 102. In one or more examples, each one of the work cells 202 includes one or more systems, sub-systems, apparatuses, and/or machines that perform at least one post-cure processing operation. In one or more examples, the work cells 202 are interlinked (e.g., in series or parallel) and cooperate to automate at least a portion of the fabrication process.

Referring to FIGS. 1, 12 and 14-17, in one or more examples, at least a portion of the system 100 is associated with at least one of the work cells 202. In one or more examples, the system 100 forms a sub-system of the manufacturing environment 200. The system 100 facilitates transporting the composite workpiece 102 through the work cells 202, indexing the composite workpiece 102 relative to the work cells 202, conforming the composite workpiece 102 to the as-built shape 118, or to the as-machined shape, in the work cells 202, and performance of at least one post-cure processing operation on the composite workpiece 102 in the work cells 202.

Figure 14:
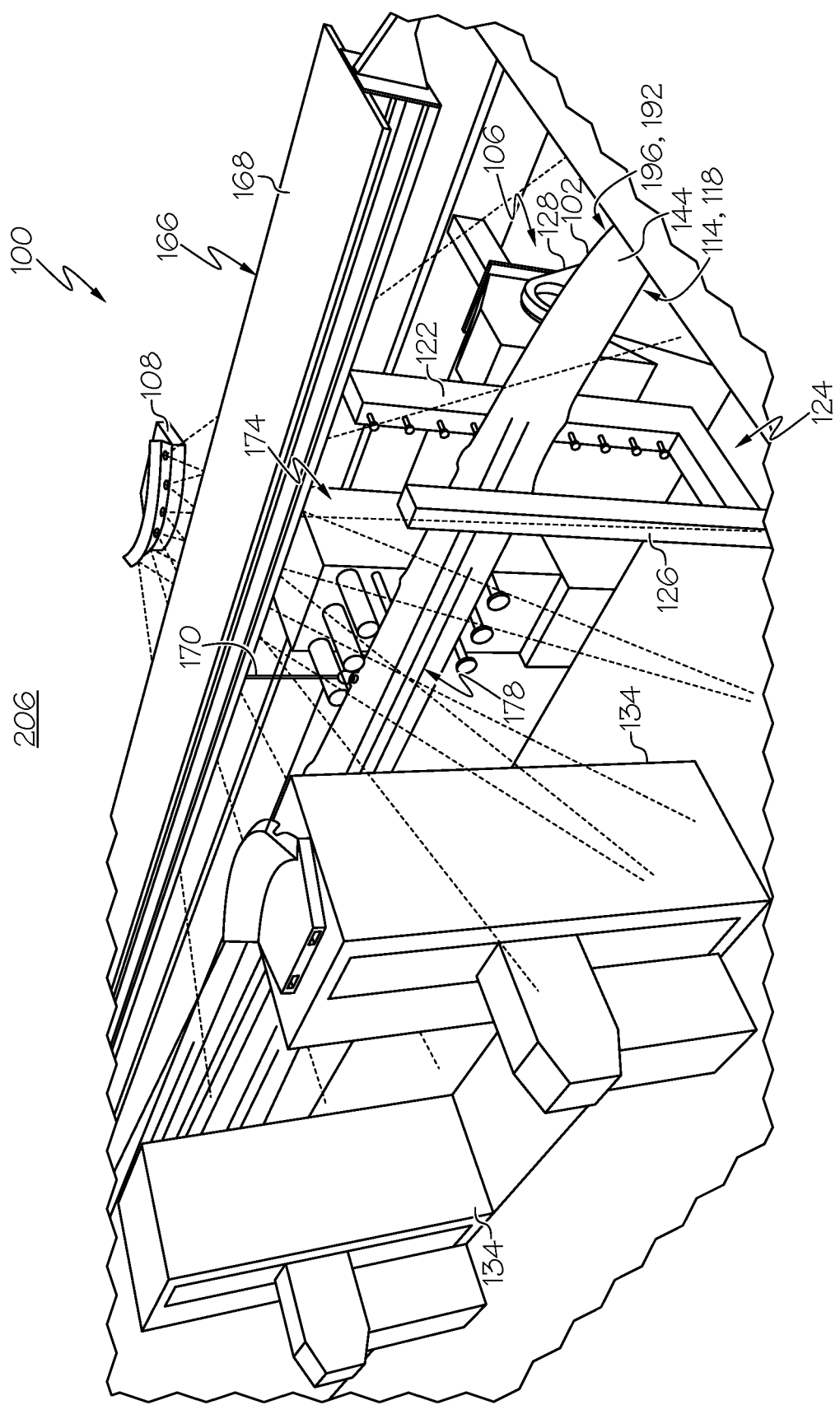
FIG. 14 is a schematic illustration of an example of a portion of the system of handling the composite workpiece, depicting the plurality of workpiece holders, the overhead workpiece handler, the composite workpiece held by the plurality of workpiece holders and the overhead workpiece handler, the second metrology system, and a plurality of machine tools, in which a machining operation is performed on the composite workpiece and as-machined measurement data, representative of the composite workpiece, is generated.

As best illustrated in FIG. 14, in one or more examples, at least a portion of the system 100 is associated with the second work cell 206. The system 100 facilitates indexing of the composite workpiece 102 relative to the second work cell 206, conforming the composite workpiece 102 to the as-built shape 118, and performing at least one post-cure processing operation (e.g., drilling) on the composite workpiece 102 in the second work cell 206 with the composite workpiece 102 appropriately indexed and conformed to the as-built shape 118.

Figure 15:
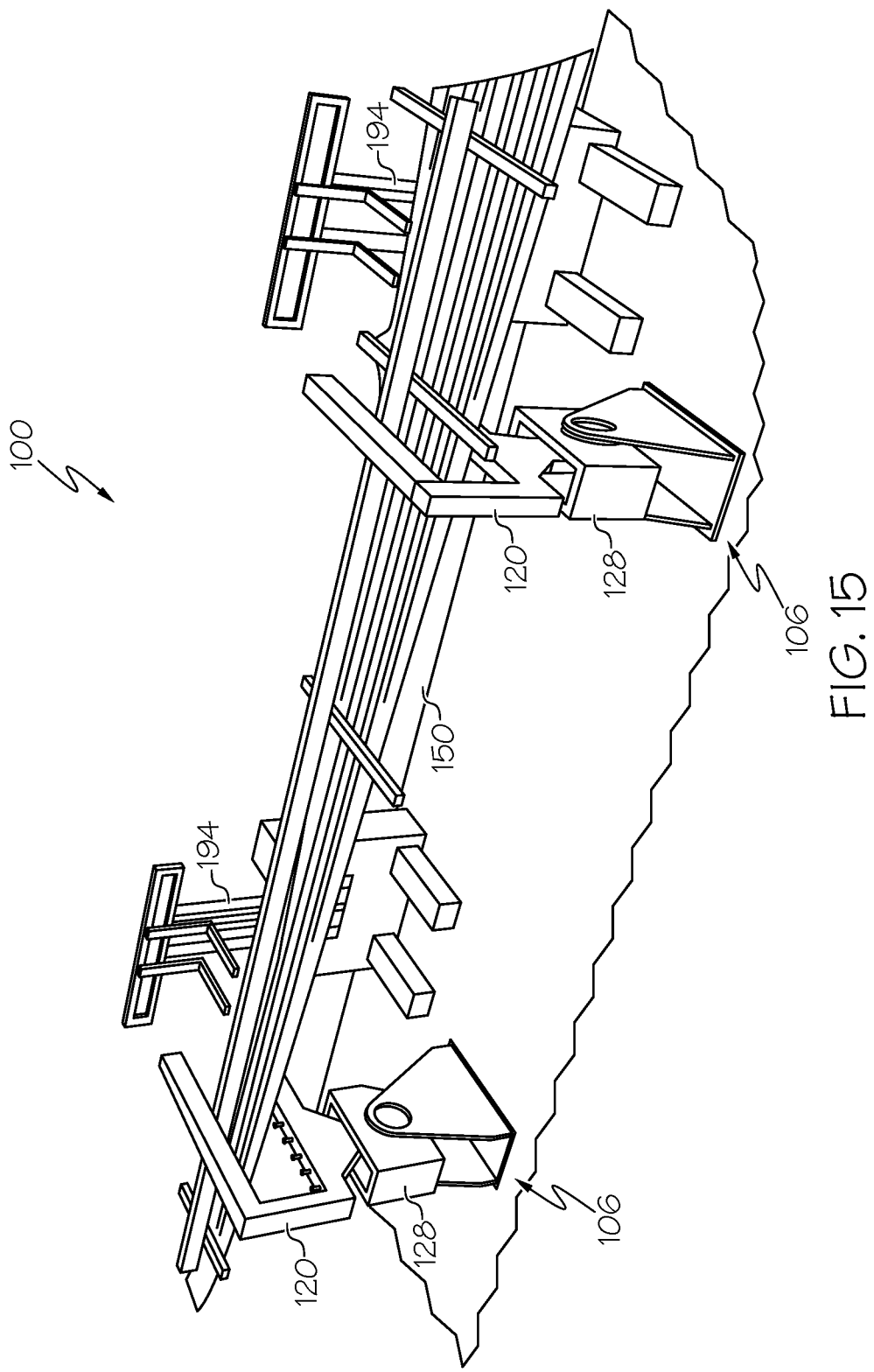
FIG. 15 is a schematic illustration of an example of a portion of the system for handling the composite workpiece, depicting the plurality of material handler, the composite workpiece, and the plurality of workpiece holders.
Figure 16:
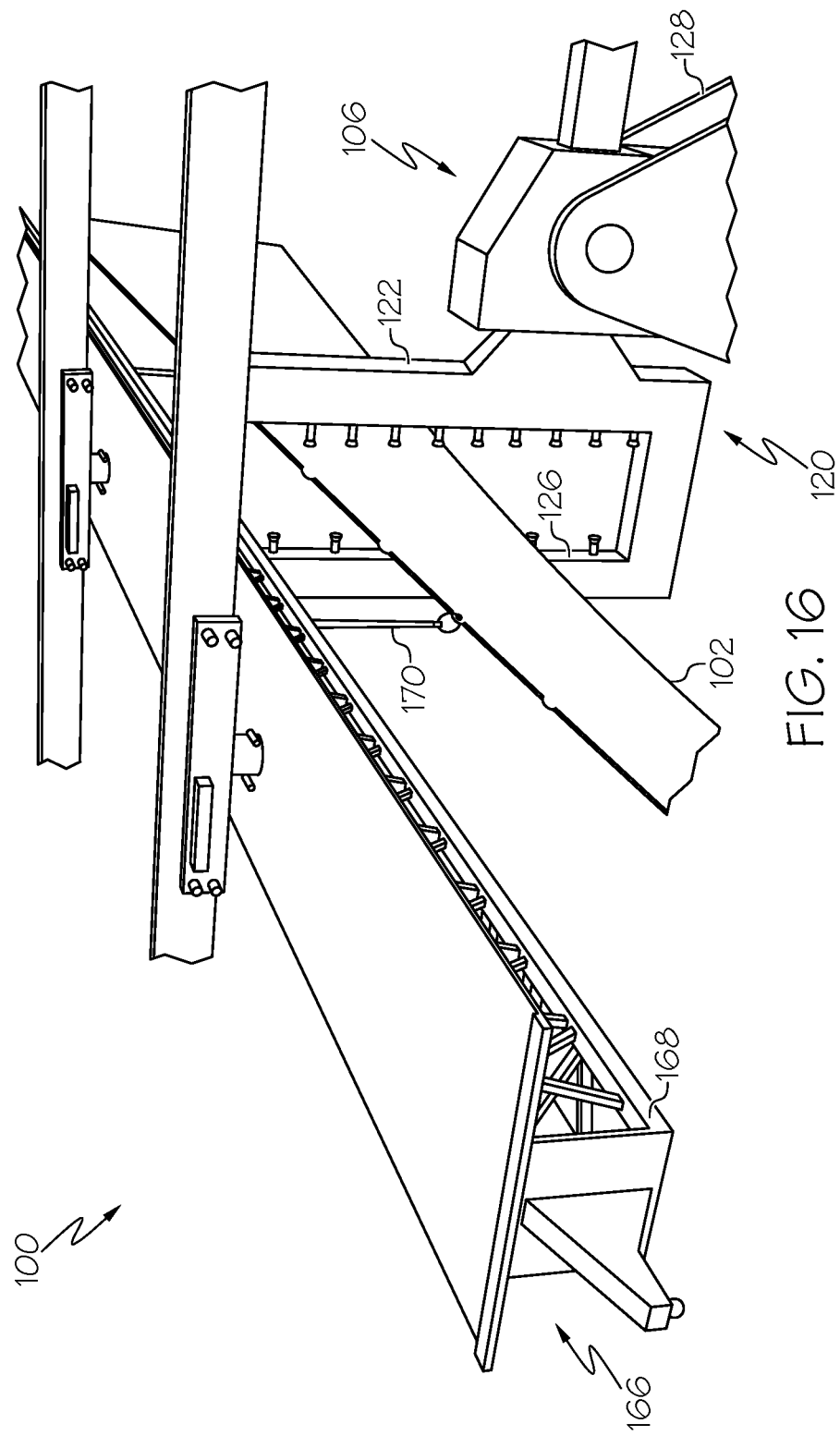
FIG. 16 is a schematic illustration of an example of a portion of the system for handling the composite workpiece, depicting the plurality of workpiece holders, the overhead workpiece handler, and the composite workpiece held by the overhead workpiece handler.
Figure 17:
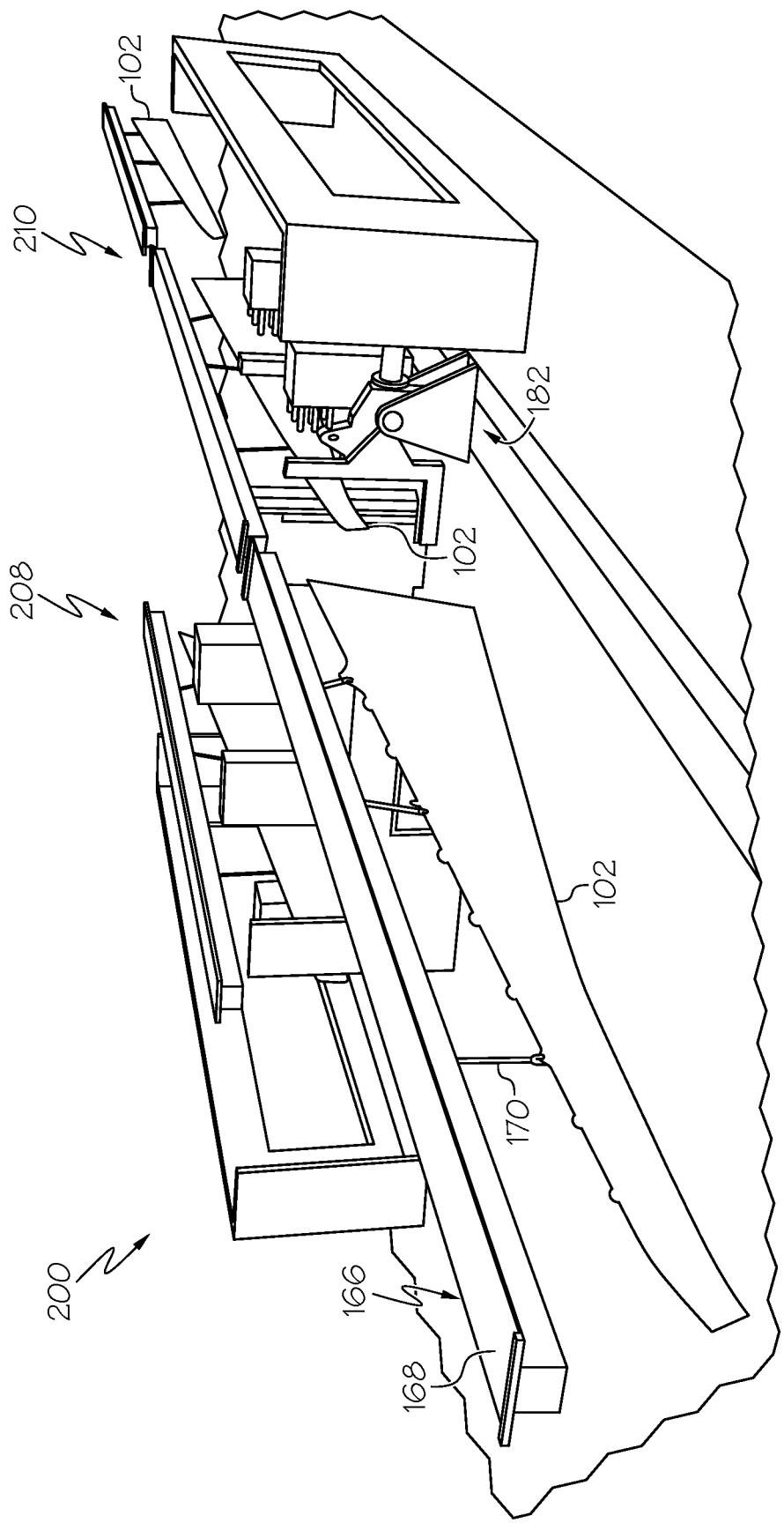
FIG. 17 is a schematic illustration of an example of a portion of the system for handling the composite workpiece, depicting the plurality of workpiece holders, the overhead material handler, a plurality of composite workpieces held by the overhead workpiece handler.

As best illustrated in FIGS. 15-17, in one or more examples, at least a portion of the system 100 is associated with the first work cell 204. After the composite workpiece 102 is cured (e.g., using a curing apparatus, such as an oven or autoclave), the composite workpiece 102 is transported to the first work cell 204 on a tool 150. In one or more examples, the tool 150 is a cure tool upon which the composite workpiece 102 was cured.

Figure 2:
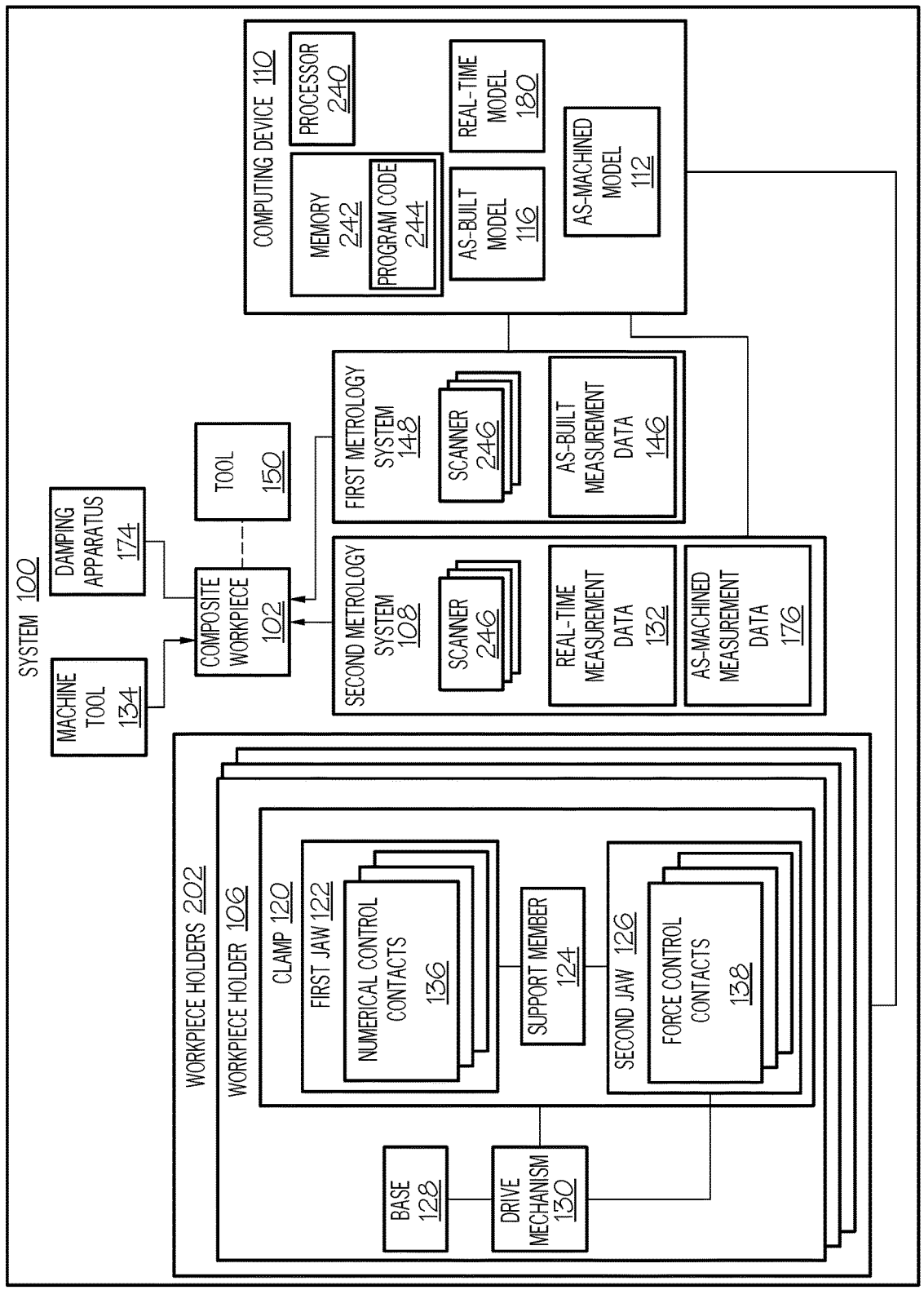
FIG. 2 is a schematic block diagram of an example of a system for handling the composite workpiece.
Figure 12:
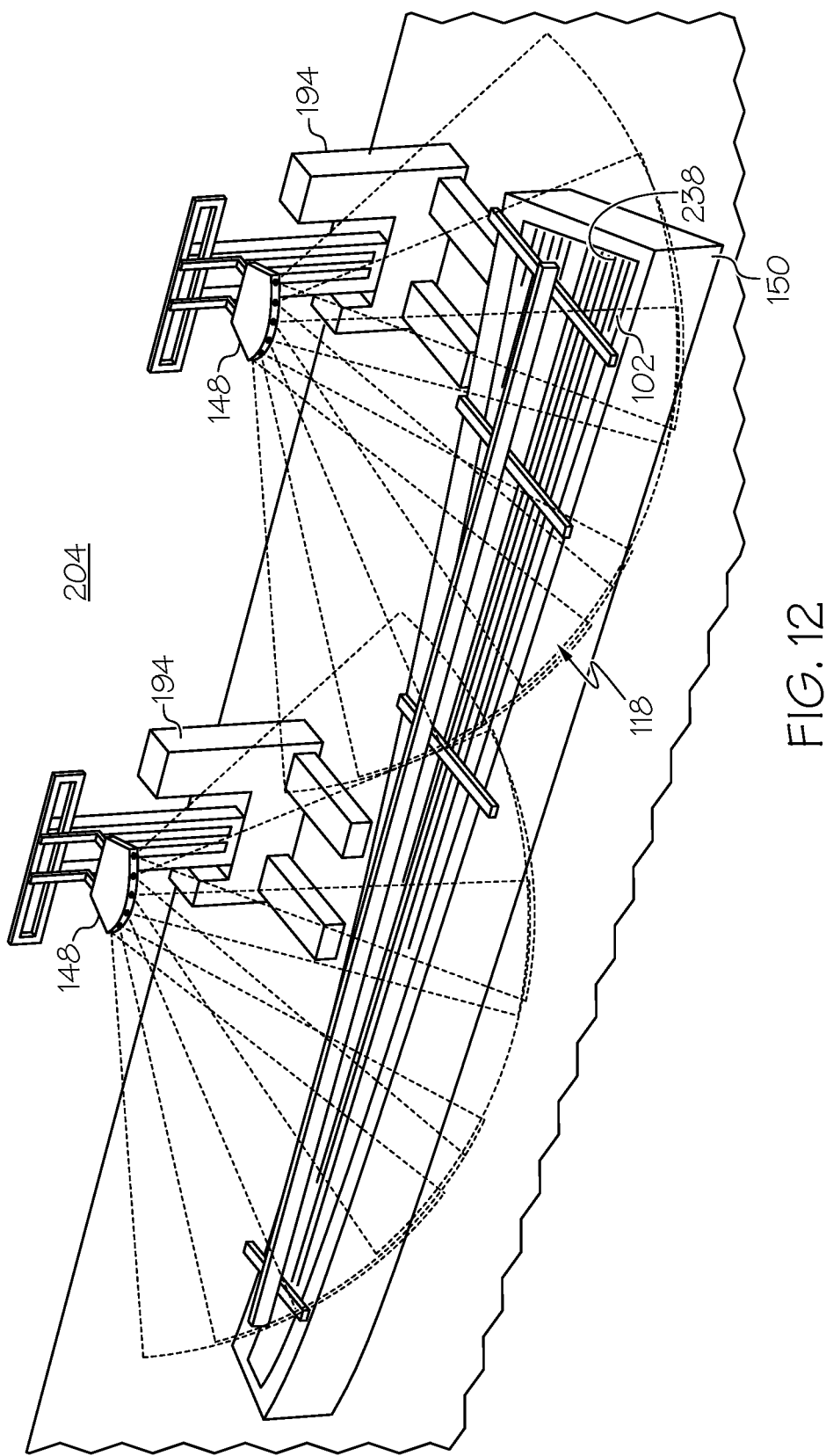
FIG. 12 is a schematic illustration of an example of one of a portion of the system for handling the composite workpiece, depicting a plurality of material handlers, a tool, the composite workpiece on the tool, and a first metrology system, in which as-built measurement data, representative of the composite workpiece on the tool, is generated.

As best illustrated in FIG. 12, in one or more examples, the composite workpiece 102 is digitized while on the tool 150 to capture the as-built shape 118 of the composite workpiece 102. In one or more examples, an as-built model 116 (e.g., as shown in FIG. 2) is generated that represents the composite workpiece 102 in the as-built shape 118.

In one or more examples, an initial post-cure processing operation (e.g., a machining, drilling, or trimming operation) may be performed on the composite workpiece 102 while the composite workpiece 102 is on the tool 150 (e.g., in the first work cell 204). In these examples, the composite workpiece 102 is digitized after the initial post-cure processing operation. As such, the as-built model 116 may also represent initially machined features of the composite workpiece 102.

As best illustrated in FIG. 15, in one or more examples, the composite workpiece 102 is removed from the tool 150 and is transported from the first work cell 204 to the second work cell 206 for performance of a post-cure processing operation.

As best illustrated in FIG. 17, in one or more examples, the composite workpiece 102 is then successively transported from one of the work cells 202 (e.g., the second work cell 206) to another one of the work cells 202 (e.g., the third work cell 208) for performance of subsequent post-cure processing operations. This process may be repeated any number of times to move the composite workpiece 102 through the work cells 202 and to perform any number of post-cure processing operations.

Figure 3:
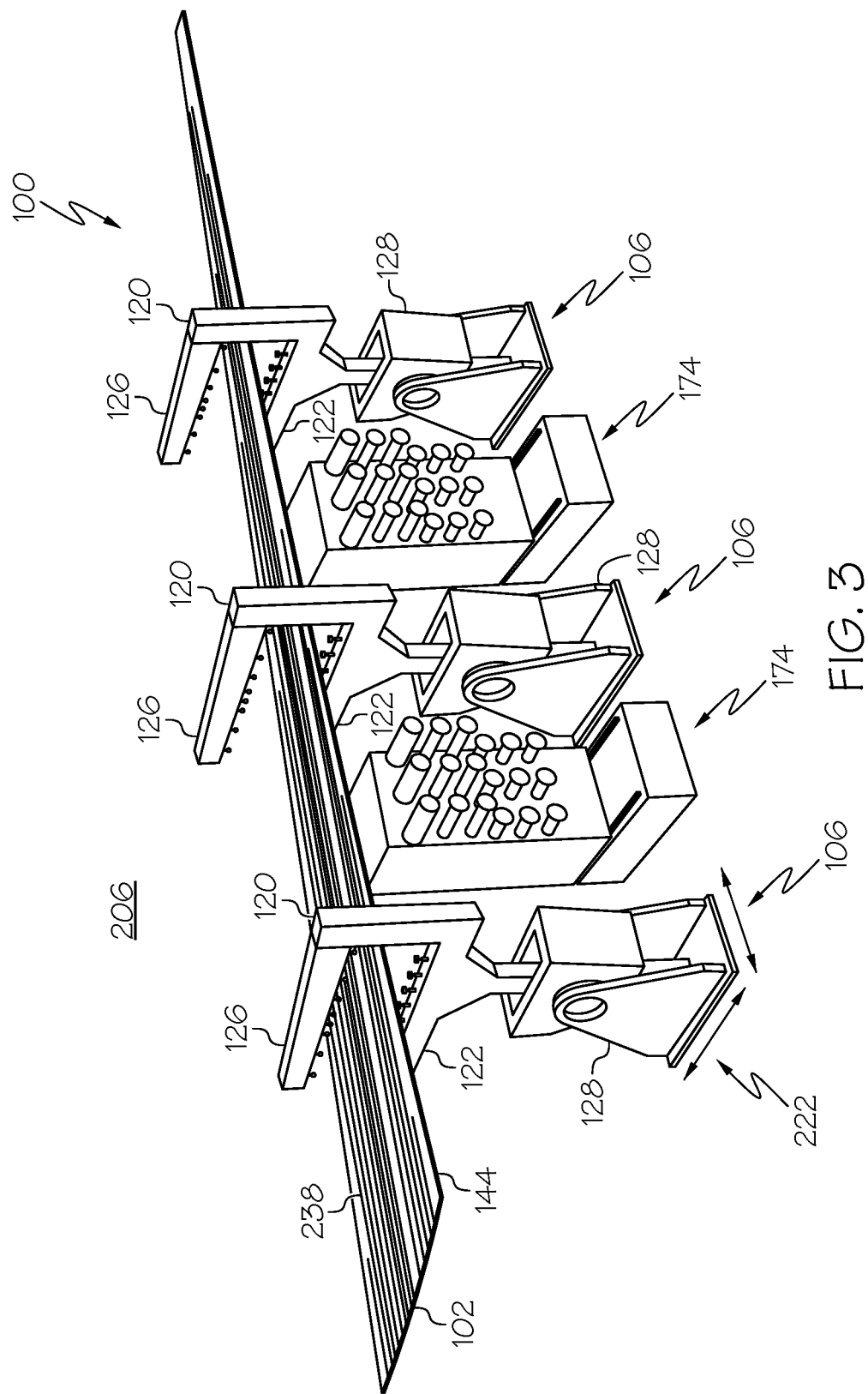
FIG. 3 is a schematic, perspective view of an example of a plurality of workpiece holders of the system and the composite workpiece.
Figure 4:
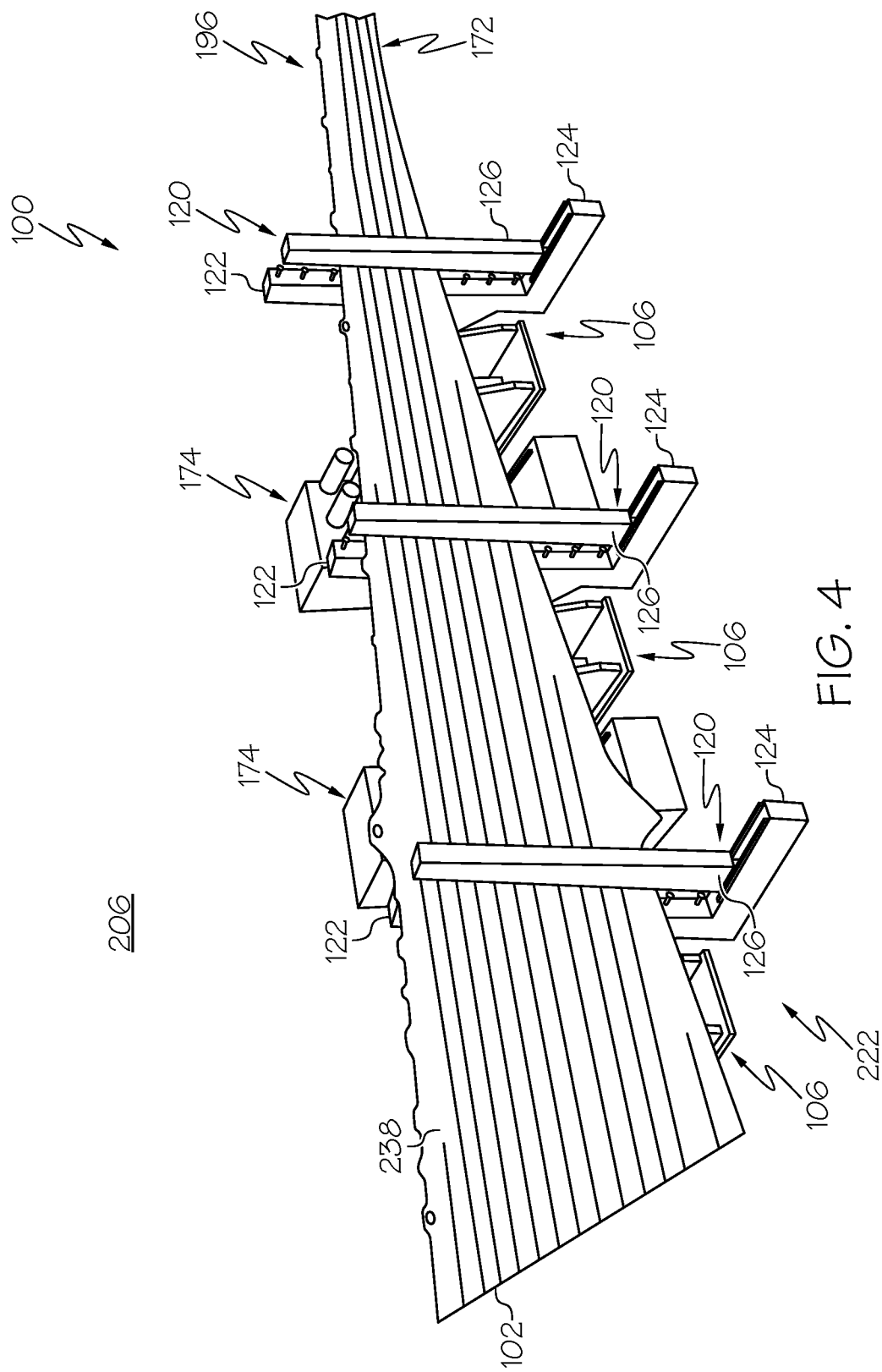
FIG. 4 is a schematic, perspective view of an example of the plurality of workpiece holders and the composite workpiece held by the workpiece holders.

Referring now to FIGS. 2-4, in one or more examples, the system 100 includes or is associated with at least one of the work cells 202 (e.g., the second work cell 206). The system 100 includes a plurality of workpiece holders 222. The workpiece holders 222 hold the composite workpiece 102 in the second work cell 206. Each one of the workpiece holders 222 is selectively controlled to index the composite workpiece 102 in the second work cell 206. For example, with the composite workpiece 102 held by the workpiece holders 222, the workpiece holders 222 appropriately position the composite workpiece 102 in the second work cell 206 for performance of a post-cure processing operation. Additionally, the workpiece holders 222 conform the composite workpiece 102 to the as-built shape 118 of the composite workpiece 102, for example, before and/or during performance of a post-cure processing operation.

Figure 5:
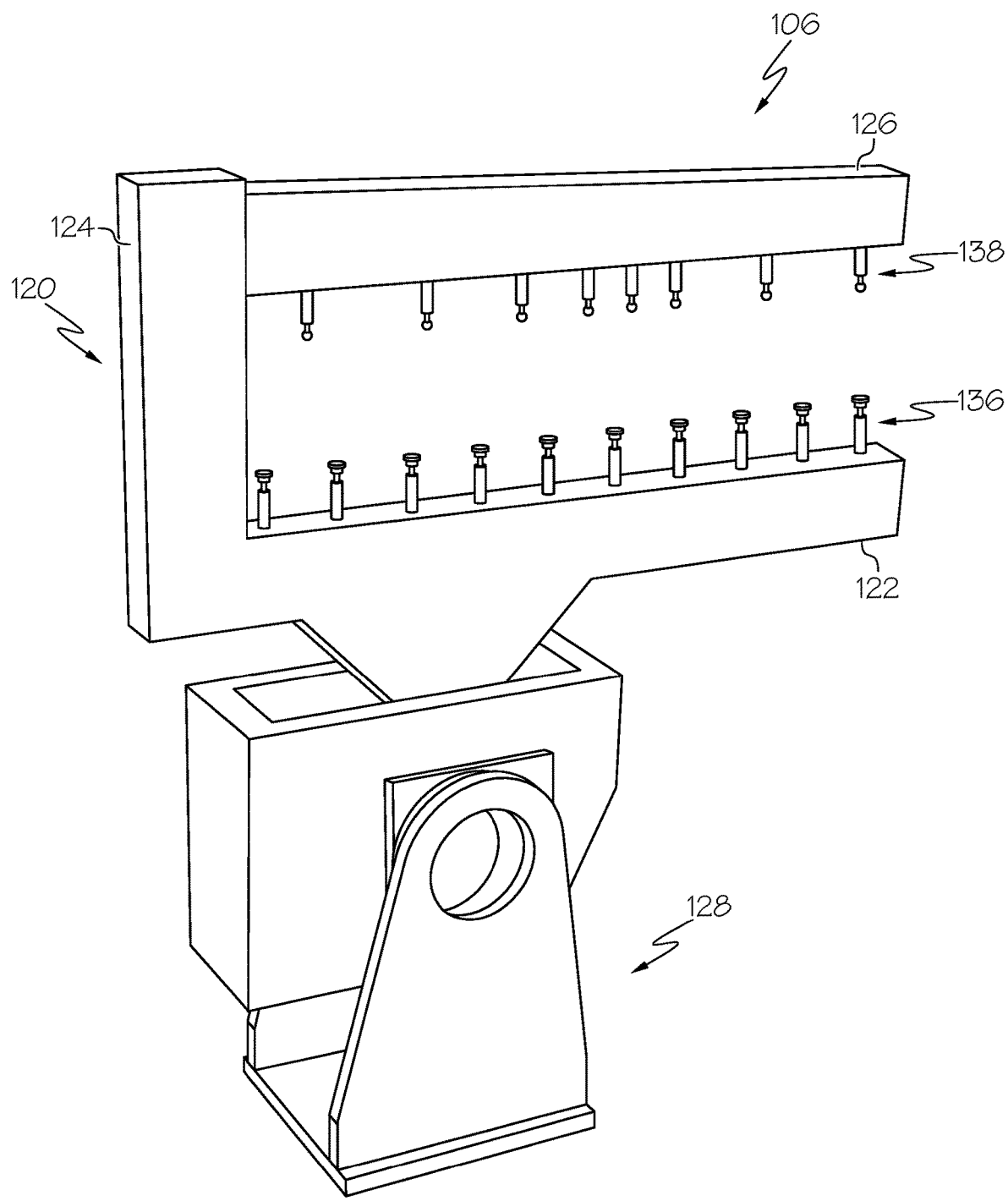
FIG. 5 is a schematic, perspective view of an example of a workpiece holder.
Figure 6:
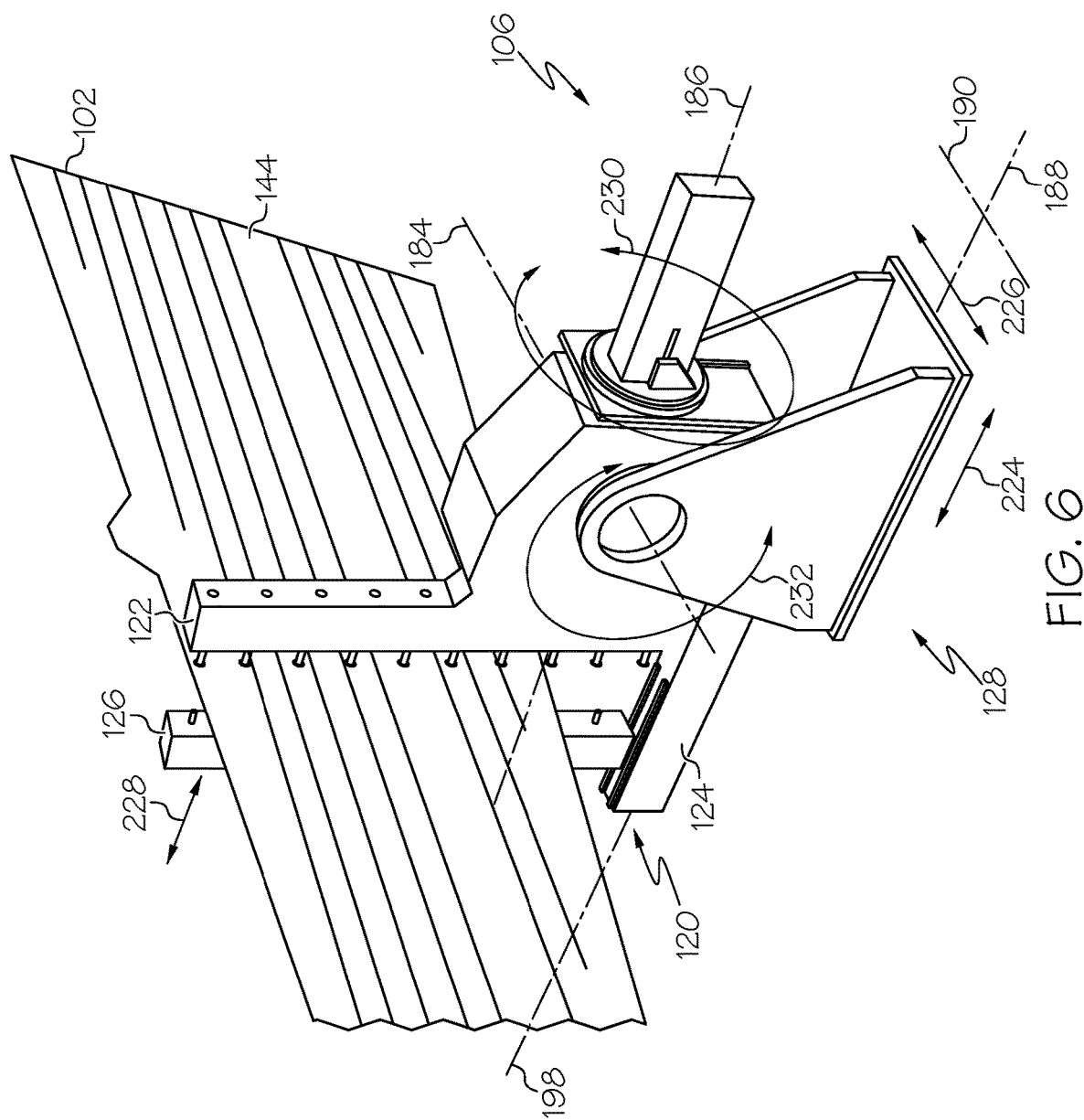
FIG. 6 is a schematic, perspective view of an example of the workpiece holder and the composite workpiece held by the workpiece holder.

Referring now to FIGS. 5 and 6, which schematically illustrate examples of a workpiece holder 106. The workpiece holder 106 is an example of at least one of the workpiece holders 222 (e.g., as shown in FIGS. 2-4). In some examples, each one of the workpiece holders 222 is substantially the same, for example, includes substantially the same features and/or operates substantially the same, as the workpiece holder 106. In other examples, one or more of the workpiece holders 222 is different, for example, includes different features and/or operates different, than as the example of the workpiece holder 106.

In one or more examples, the workpiece holder 106 includes a base 128 and a clamp 120. The clamp 120 is coupled to the base 128. In one or more examples, the clamp 120 is movable relative to the base 128 to appropriately position the clamp 120 in the work cell (e.g., the second work cell 206) and/or relative to the composite workpiece 102. In one or more examples, the base 128 is located on a manufacturing floor of the manufacturing environment 200 (e.g., FIG. 1) in one of the work cells 202(e.g., the second work cell 206). In one or more examples, the base 128 is movable relative to one of the work cells 202 (e.g., the second work cell 206) to appropriately locate the clamp 120 in the work cell and/or relative to the composite workpiece.

Referring to FIG. 6, in one or more examples, the base 128 of the workpiece holder 106 is linearly movable along a first translation axis 188 (e.g., in the directions of first directional arrow 224). In one or more examples, the base 128 of the workpiece holder 106 is linearly movable along a second translation axis 190 (e.g., in the directions of second directional arrow 226). The second translation axis 190 is approximately perpendicular to the first translation axis 188.

With the clamp 120 unclamped from the composite workpiece 102, movement of the base 128 along the first translation axis 188 locates the clamp 120 along the first translation axis 188, for example, relative to the composite workpiece 102.

With the clamp 120 clamped to the composite workpiece 102, movement of the base 128 along the first translation axis 188 locates the composite workpiece 102 along the first translation axis 188, for example, relative to an associated one of the work cells 202 (e.g., the second work cell 206) or relative to a machine tool 134 (e.g., as shown in FIG. 14) associated with one of the work cells 202 (e.g., the second work cell 206).

With the clamp 120 unclamped from the composite workpiece 102, movement of the base 128 along the second translation axis 190 locates the clamp 120 along the second translation axis 190, for example, relative to the composite workpiece 102.

Referring to FIGS. 2-6, in one or more examples, the clamp 120 of the workpiece holder 106 (e.g., as shown in FIGS. 5 and 6) or any one of the workpiece holders 222 (e.g., as shown in FIGS. 2-4) includes a first jaw 122, a support member 124 that is coupled to the first jaw 122, and a second jaw 126 that is coupled to the support member 124. The second jaw 126 is movable along the support member 124 relative to the first jaw 122 to clamp the composite workpiece 102 between the first jaw 122 and the second jaw 126. In one or more examples, the second jaw 126 and the first jaw 122 clamp the composite workpiece 102 in the as-built shape 118.

Referring again to FIG. 6, in one or more examples, the second jaw 126 of the clamp 120 is linearly movable along a third translation axis 198 relative to the first jaw 122 (e.g., in the directions of third directional arrow 228). Movement of the second jaw 126 along the third translation axis 198 clamps or unclamps a portion of the composite workpiece 102 between the first jaw 122 and the second jaw 126.

Referring still to FIG. 6, in one or more examples, the clamp 120 of the workpiece holder 106 is rotationally movable about a first rotation axis 184 relative to the base 128 of the workpiece holder 106 (e.g., in the directions of fourth directional arrow 232). In one or more examples, clamp 120 of the workpiece holder 106 is rotationally movable about a second rotation axis 186 relative to the base 128 of the workpiece holder 106 (e.g., in the directions of fifth directional arrow 230). The second rotation axis 186 is approximately perpendicular to the first rotation axis 184. The second rotation axis 186 is approximately parallel to or coaxial with the first translation axis 188. The first rotation axis 184 is approximately parallel to or coaxial with the second translation axis 190.

With the clamp 120 unclamped from the composite workpiece 102, movement of the clamp 120 about the second rotation axis 186 adjusts an angular orientation of the first jaw 122 and the second jaw 126 about the second rotation axis 186 relative to the composite workpiece 102.

With the clamp 120 clamped to the composite workpiece 102, movement of the clamp 120 about the first rotation axis 184 adjusts an angular orientation of the composite workpiece 102 about the first rotation axis 184.

Accordingly, movement of the second jaw 126 relative to the first jaw 122 clamps the composite workpiece 102 within the clamp 120. Movement of the clamp 120 relative to the base 128 and movement of the base 128 appropriately positions the composite workpiece 102 in one of the work cells 202. For example, movement of the clamp 120 relative to the base 128 and movement of the base 128 indexes the composite workpiece 102 in one of the work cells 202 for performance of a post-cure processing operation.

Figure 7:
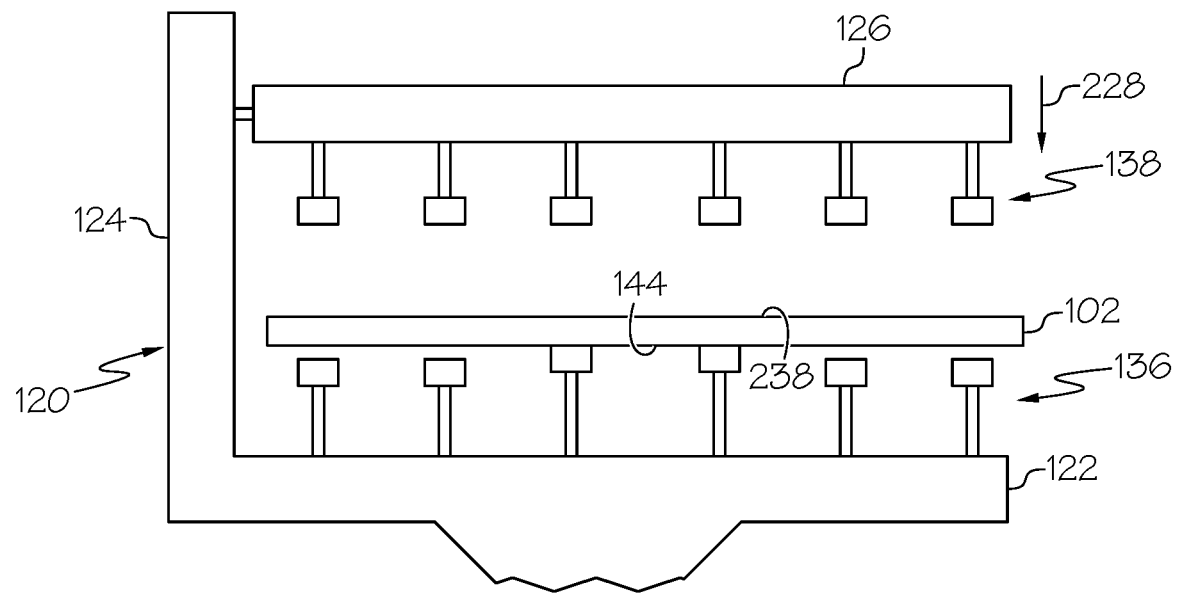
FIG. 7 is a schematic illustration of a clamp of the workpiece holder, depicted in a pre-clamped state.
Figure 8:
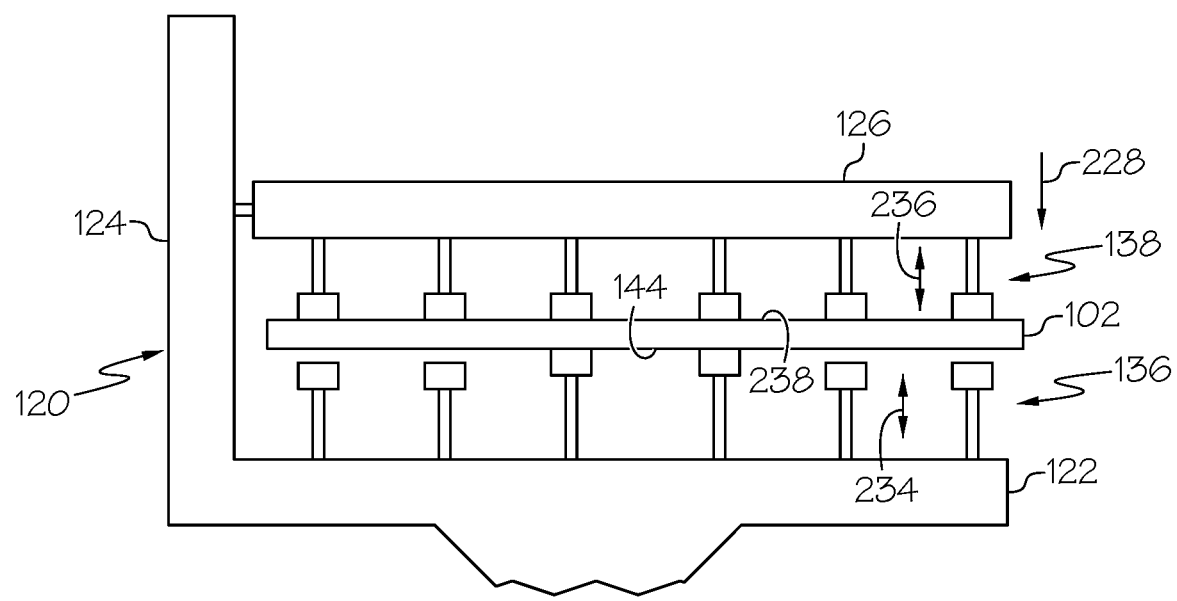
FIG. 8 is a schematic illustration of an example of the clamp of the workpiece holder, depicted in a clamped state.
Figure 9:
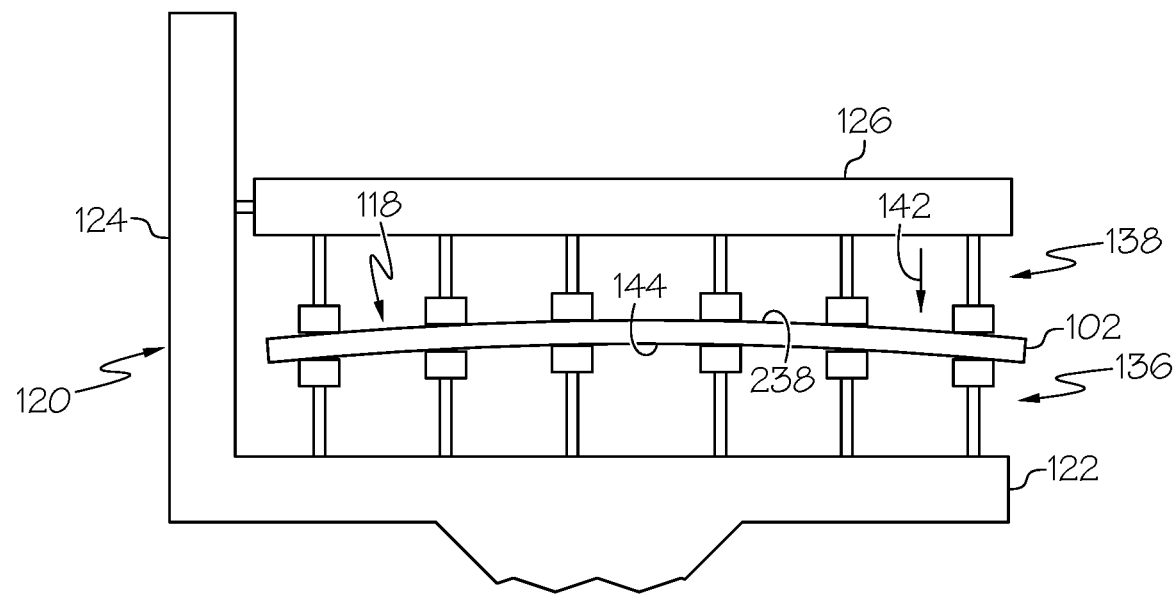
FIG. 9 is a schematic illustration of an example of the clamp of the workpiece holder, depicted in a shape-conforming state.
Figure 11:
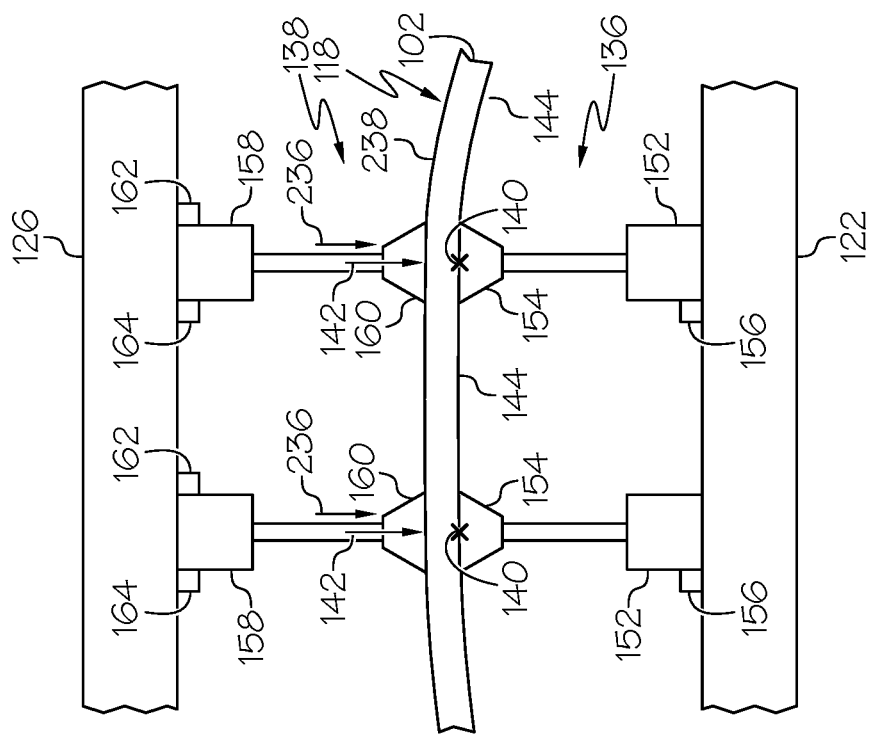
FIG. 11 is a schematic illustration of an example of a portion of the clamp of the workpiece holder, depicted in the shape-conforming state.
Figure 10:
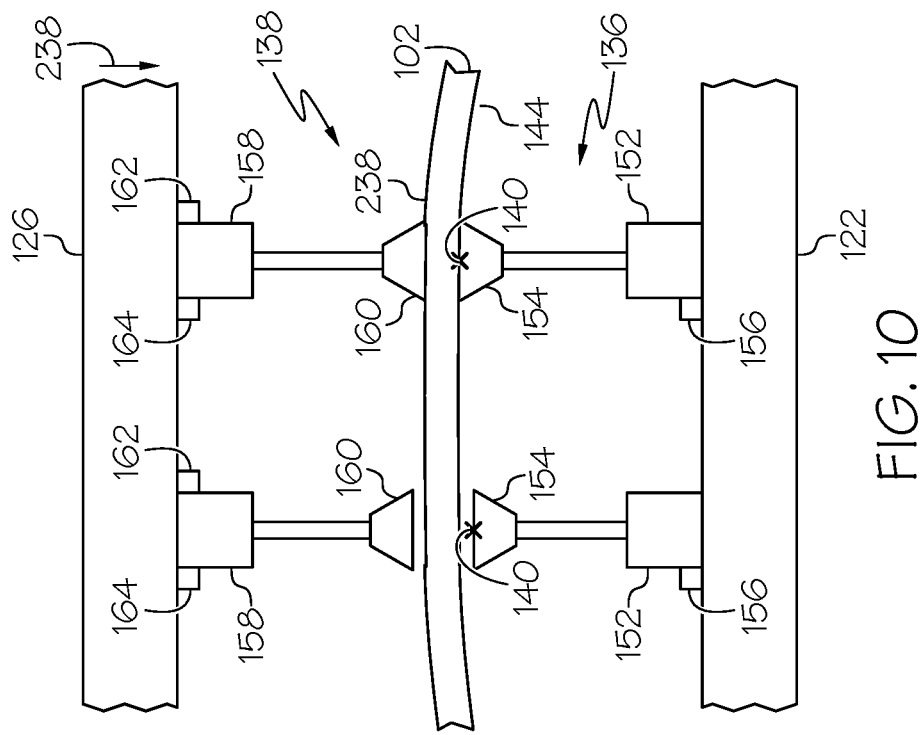
FIG. 10 is a schematic illustration of an example of a portion of the clamp of the workpiece holder, depicted in the clamped state.

Referring now to FIGS. 7-9, which schematically illustrate examples of the clamp 120 of the workpiece holder 106, and to FIGS. 10 and 11, which schematically illustrate examples of a portion of the clamp 120. In one or more examples, the workpiece holder 106 (e.g., at least one of the workpiece holders 222) includes a plurality of numerical control contacts 136. Throughout the present disclosure, the term "numerical control" may be referred to as "NC." The numerical control contacts 136 are located along the first jaw 122. The workpiece holder 106 also includes a plurality of force control contacts 138. The force control contacts 138 are located along the second jaw 126.

Each one of the numerical control contacts 136 is selectively movable relative to the first jaw 122 to a numerical control location 140 (e.g., as shown in FIGS. 10 and 11). The numerical control location 140 for each one of the numerical control contacts 136 is based on the as-built shape 118 of the composite workpiece 102.

Each one of the force control contacts 138 is selectively movable relative to the second jaw 126 to apply a shaping force 142 (e.g., as shown in FIGS. 9-11) to the composite workpiece 102. The shaping force 142, applied by each one of the force control contacts 138, forces the composite workpiece 102 against the numerical control contacts 136 to conform the composite workpiece 102 to the as-built shape 118 of the composite workpiece 102.

As illustrated in FIGS. 7, 8 and 10, in one or more examples, the composite workpiece 102 is positioned between the first jaw 122 and the second jaw 126 of the clamp 120. In one or more examples, a portion of a first surface 144 of the composite workpiece 102 is supported on, is support by, or is in contact with one or more of the numerical control contacts 136 before the composite workpiece 102 is clamped between the first jaw 122 and the second jaw 126 (e.g., as shown in FIG. 7).

The second jaw 126 is moved toward the first jaw 122 (e.g., in the direction of third directional arrow 228 shown in FIGS. 7 and 10) to move the force control contacts 138 toward a second surface 238 of the composite workpiece 102. In one or more examples, the second jaw 126 is moved toward the first jaw 122 until at least one of the force control contacts 138 is in contact with the second surface 238 of the composite workpiece 102 (e.g., as shown in FIGS. 8 and 10). In one or more examples, the second jaw 126 is moved toward the first jaw 122 to clamp a portion of the composite workpiece 102 between the first jaw 122 and the second jaw 126 and, more particularly, between at least one of the numerical control contacts 136 and at least one of the force control contacts 138.

In one or more examples, each one of the numerical control contacts 136 is linearly movable (e.g., extends and retracts) relative to the first jaw 122 (e.g., in the directions of sixth directional arrow 234 shown in FIG. 8). Each one of the numerical control contacts 136 moves (e.g., extends or retracts) to the numerical control location 140 associated with it (e.g., as shown in FIG. 10).

In one or more examples, each one of the numerical control contacts 136 is moved to the numerical control location 140 before the composite workpiece 102 is placed between the first jaw 122 and the second jaw 126. In one or more examples, each one of the numerical control contacts 136 is moved to the numerical control location 140 after the composite workpiece 102 is placed between the first jaw 122 and the second jaw 126.

As illustrated in FIG. 7, with the numerical control contacts 136 moved to the numerical control location 140, one or more of the numerical control contacts 136 may not be in contact with the first surface 144 of the composite workpiece 102 upon placement of the composite workpiece 102 between the first jaw 122 and the second jaw 126. As illustrated in FIGS. 8 and 10, with the numerical control contacts 136 moved to the numerical control location 140, one or more of the numerical control contacts 136 may not be in contact with the first surface 144 of the composite workpiece 102 upon initial movement of the second jaw 126 to initially clamp the composite workpiece 102.

In one or more examples, the numerical control location 140 of each one of the numerical control contacts 136 corresponds to a coordinate location on the first surface 144 of the composite workpiece 102 having the as-built shape 118. In one or more examples, the coordinate location on the first surface 144 of the composite workpiece 102 is represented by or is extracted from the as-built model 116 (e.g., as shown in FIG. 2) of the composite workpiece 102. The as-built model 116 is representative of the composite workpiece 102 having the as-built shape 118. As such, with each one of the numerical control contacts 136 at the numerical control location 140, the numerical control contacts 136 match a shape or contour of the first surface 144 of the composite workpiece 102 having the as-built shape 118.

As illustrated in FIGS. 8, 9 and 11, with the composite workpiece 102 initially clamped between the first jaw 122 and the second jaw 126 and, more particularly, between at least one of the numerical control contacts 136 and at least one of the force control contacts 138, each one of the force control contacts 138 moves into contact with the second surface 238 of the composite workpiece 102 and applies the shaping force 142 (e.g., as shown in FIGS. 9 and 11) to a portion of the composite workpiece 102. The shaping force 142, applied by the force control contacts 138, urges the portion of the composite workpiece 102 toward and against the numerical control contacts 136 such that the numerical control contacts 136 are in contact with the first surface 144 of the composite workpiece 102. As such, the force control contacts 138 conform the composite workpiece 102 to the as-built shape 118, which is defined by each one of the numerical control contacts 136 at the numerical control location 140.

In one or more examples, each one of the force control contacts 138 is linearly movable (e.g., extends and retracts) relative to the second jaw 126 (e.g., in the directions of seventh directional arrow 236 shown in FIGS. 8 and 11). Each one of the force control contacts 138 moves (e.g., extends) to apply the shaping force 142 to the composite workpiece 102. In one or more examples, each one of the force control contacts 138 moves (e.g., extends) until a threshold force is achieved. In one or more examples, the shaping force 142 is less than or equal to the threshold force. As such, the threshold force limits the shaping force 142 or represents a maximum magnitude of the shaping force 142 required to urge the composite workpiece 102 against the numerical control contacts 136 and, thus, limits movement (e.g., extension) of the force control contacts 138.

As illustrated in FIGS. 9 and 11, with the numerical control contacts 136 moved to the numerical control location 140 and the force control contacts 138 moved until reaching the threshold force, each one of the numerical control contacts 136 is in contact with the first surface 144 of the composite workpiece 102 and each one of the force control contacts 138 is in contact with the second surface 238 of the composite workpiece 102, the composite workpiece 102 is clamped between the numerical control contacts 136 and the force control contacts 138, and the composite workpiece 102 is conformed to the as-built shape 118.

Referring now to FIGS. 10 and 11, in one or more examples, each one of the numerical control contacts 136 includes a numerical control actuator 152 and a first vacuum gripper 154 that is coupled to the numerical control actuator 152.

In one or more examples, the workpiece holder 106 also includes a first actuator control unit 156. The first actuator control unit 156 controls extension and retraction of the numerical control actuator 152 to locate an end of the first vacuum gripper 154 at the numerical control location 140.

In one or more examples, the first actuator control unit 156 is dedicated to and provides instructions to one of the numerical control contacts 136. For example, each one of the numerical control contacts 136 includes the first actuator control unit 156.

In one or more examples, the first actuator control unit 156 is shared by and provides instructions to more than one of the numerical control contacts 136. For example, a set (e.g., portion) of the numerical control contacts 136 includes the first actuator control unit 156.

Referring still to FIGS. 10 and 11, in one or more examples, each one of the force control contacts 138 includes a force control actuator 158 and a second vacuum gripper 160 that is coupled to the force control actuator 158.

In one or more examples, the workpiece holder 106 includes a force sensor 162. The force sensor 162 detects a load, or reaction force, applied to the force control actuator 158 by the composite workpiece 102 as the force control contacts 138 apply the shaping force 142 to the composite workpiece 102.

In one or more examples, the workpiece holder 106 includes a second actuator control unit 164. The second actuator control unit 164 controls extension and retraction of the force control actuator 158 to apply the shaping force 142 to the composite workpiece 102.

The force sensor 162 is coupled to or is in communication with the second actuator control unit 164. The load, or reaction force, applied to the force control actuator 158 by the composite workpiece 102 is compared to the threshold force. Upon the load, or reaction force, applied to the force control actuator 158 by the composite workpiece 102 and detected by the force sensor 162 being equal to the threshold value, the second actuator control unit 164 instructs the force control actuator 158 to stop moving.

In one or more examples, the second actuator control unit 164 is dedicated to and provides instructions to one of the force control contacts 138. For example, each one of the force control contacts 138 includes the second actuator control unit 164.

In one or more examples, the second actuator control unit 164 is shared by and provides instructions to more than one of the force control contacts 138. For example, a set (e.g., portion) of the force control contacts 138 includes the second actuator control unit 164.

In one or more examples, the force sensor 162 is dedicated to and detects the load applied to one of the force control contacts 138. For example, each one of the force control contacts 138 includes the force sensor 162.

In one or more examples, the force sensor 162 is shared by and detects loads applied to more than one of the force control contacts 138. For example, a set (e.g., portion) of the force control contacts 138 includes the force sensor 162.

Referring again to FIG. 2, in one or more examples, the workpiece holder 106 includes a drive mechanism 130. In one or more examples, the drive mechanism 130 selectively moves the second jaw 126 along the support member 124 relative to the first jaw 122. In one or more examples, the drive mechanism 130 selectively moves the clamp 120 relative to the base 128. The drive mechanism 130 includes any suitable type and/or number of motor and drive systems, such as a mechanical drive, a hydraulic drive, an electric drive, a pneumatic drive, or a combination thereof.

Referring now to FIGS. 3, 4, 6 and 14, in one or more examples, with the composite workpiece 102 held by the clamp 120 of the workpiece holder 106 (e.g., each one of the workpiece holders 222), the drive mechanism 130 rotates the clamp 120 about the first rotation axis 184 (e.g., as shown in FIG. 6) relative to the base 128 to adjust an angular orientation of the composite workpiece 102. In one or more examples, with the composite workpiece 102 held by the clamp 120 of the workpiece holder 106 (e.g., each one of the workpiece holders 222), the drive mechanism 130 linearly moves the base 128 along at least one of the first translation axis 188 and the second translation axis 190 (e.g., as shown in FIG. 6) relative to one of the work cells 202 to adjust a location of the composite workpiece 102.

In one or more examples, the composite workpiece 102 is initially positioned or loaded in the clamp 120, between the first jaw 122 and the second jaw 126, in first orientation, such as an approximately horizontal orientation (e.g., as shown in FIG. 3). With the composite workpiece 102 in the first orientation (e.g., approximately horizontal orientation), the clamp 120 clamps the composite workpiece 102 between the first jaw 122 and the second jaw 126 and, more particularly, between the numerical control contacts 136 and the force control contacts 138. The numerical control contacts 136 and the force control contacts 138 conform the composite workpiece 102 to the as-built shape 118.

In one or more examples, the clamp 120 rotationally moves relative to the base 128 to move the composite workpiece 102 from the first orientation (e.g., approximately horizontal orientation) to a second orientation, such as an approximately vertical orientation (e.g., as shown in FIG. 4). In one or more examples, a post-cure processing operation (e.g., drilling operation) is performed on the composite workpiece 102 in the second orientation (e.g., the approximately vertical orientation as shown in FIG. 14). Additionally, movement of the clamp 120 relative to the base 128 and/or movement of the base 128 relative to one of the work cells 202 (e.g., the second work cell 206) indexes the composite workpiece 102 for performance of the post-cure processing operation.

Referring now to FIGS. 2 and 12, which schematically illustrates an example of the first work cell 204. In one or more examples, a portion of the system 100 is associated with the first work cell 204. In one or more examples, the system 100 includes a first metrology system 148, which may also be referred to as an as-built metrology system. In one or more examples, the first metrology system 148 is movable into the first work cell 204. In one or more examples, at least a portion of the first metrology system 148 is positioned in the first work cell 204.

The first metrology system 148 digitizes the composite workpiece 102 while the composite workpiece 102 is on the tool 150 and has the as-built shape 118. In one or more examples, the first metrology system 148 generates as-built measurement data 146 (e.g., as shown in FIG. 2) for the composite workpiece 102. The as-built measurement data 146 represents at least a portion of the composite workpiece 102 while the composite workpiece 102 is on the tool 150 and has the as-built shape 118.

In an example, the first metrology system 148 digitizes at least the second surface 238 of the composite workpiece 102 such that the as-built measurement data 146 represents the shape, contour, and features (e.g., edges, holes, etc.) of the second surface 238 of the composite workpiece 102.

In one or more examples, the as-built measurement data 146 is used to generate the as-built model 116 (e.g., as shown in FIG. 2) of the composite workpiece 102 having the as-built shape 118.

Figure 13:
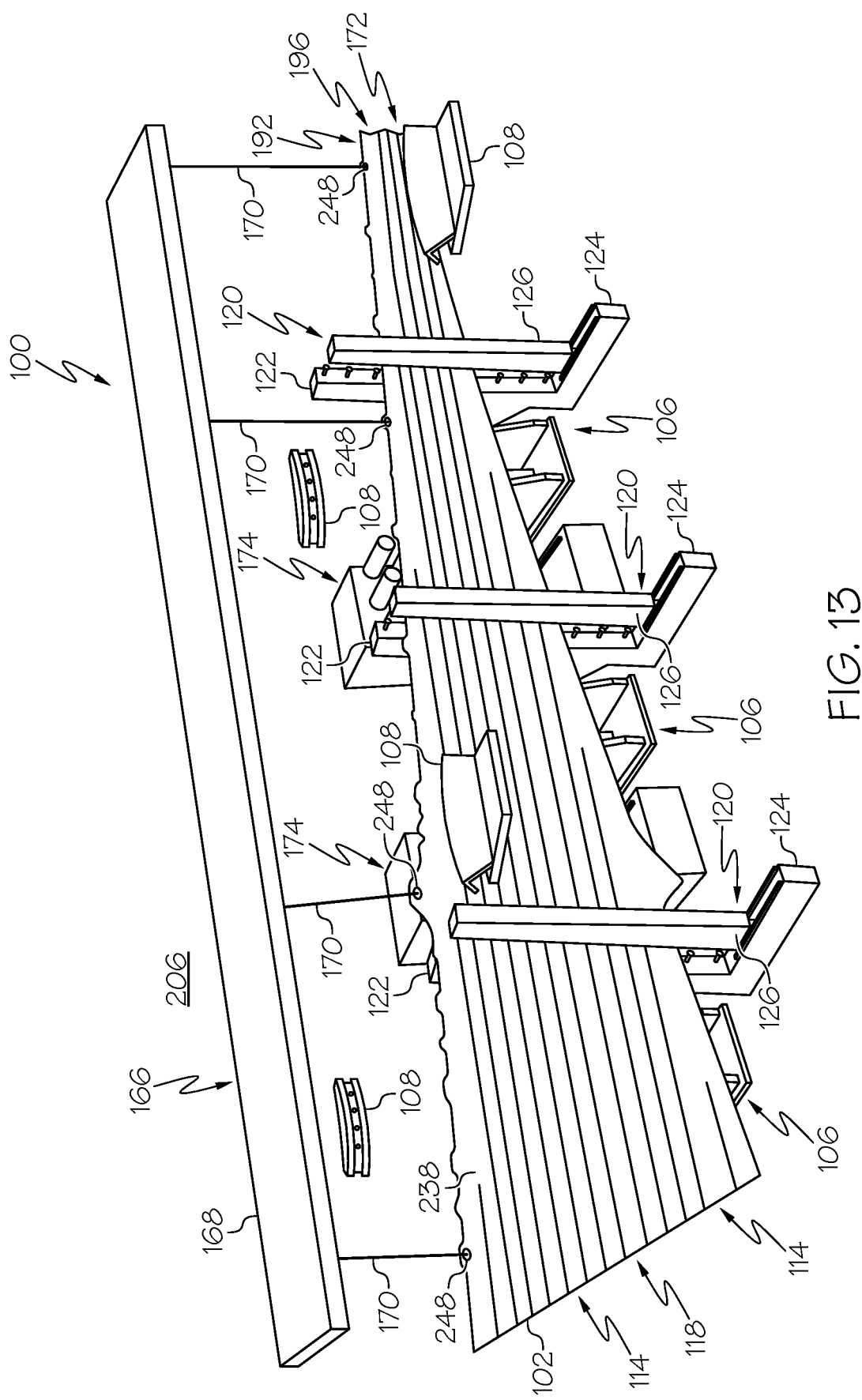
FIG. 13 is a schematic, perspective view of an example of a portion of the system for handling the composite workpiece, depicting the plurality of workpiece holders, an overhead workpiece handler, the composite workpiece held by the plurality of workpiece holders and the overhead workpiece handler, and a second metrology system, in which real-time measurement data, representative of the composite workpiece as held by the plurality of workpiece holders, is generated.

Referring now to FIG. 13, in one or more examples, at least a portion of the system 100 is associated with the second work cell 206. In one or more examples, the system 100 includes a second metrology system 108, which may also be referred to as a real-time second metrology system. In one or more examples, the second metrology system 108 is movable into the second work cell 206. In one or more examples, at least a portion of the second metrology system 108 is positioned in the second work cell 206.

The second metrology system 108 digitizes the composite workpiece 102 while the composite workpiece 102 is held in the second work cell 206 by the workpiece holders 222 and has the real-time shape 114. In one or more examples, the second metrology system 108 generates real-time measurement data 132 (e.g., as shown in FIG. 2) for the composite workpiece 102. The real-time measurement data 132 represents at least a portion of the composite workpiece 102 while the composite workpiece 102 is positioned in the second work cell 206 by the workpiece holders 222 and has the real-time shape 114, for example, as held by the workpiece holders 222.

In an example, the second metrology system 108 digitizes at least the second surface 238 of the composite workpiece 102 such that the real-time measurement data 132 represents the shape, contour, and features (e.g., edges, holes, etc.) of the second surface 238 of the composite workpiece 102. In another example, the second metrology system 108 digitizes the first surface 144 and the second surface 238 of the composite workpiece 102 such that the real-time measurement data 132 represents the shape, contour, and features (e.g., edges, holes, etc.) of the first surface 144 and the second surface 238 of the composite workpiece 102.

In one or more examples, the real-time measurement data 132 is used to generate a real-time model 112 (e.g., as shown in FIG. 2) that is representative of the composite workpiece 102 having the real-time shape 114.

In one or more examples, the first metrology system 148 and/or the second metrology system 108 includes at least one scanner 246 that scans and digitizes at least a portion of the composite workpiece 102. In one or more examples, the scanner 246 is any one of various types of three-dimensional (3D) scanners. In one or more examples, the scanner 246 includes, or is, a photogrammetric scanner, such as a photogrammetric camera. In other examples, the scanner 246 includes, or is, one of a laser triangulation scanner, a structured light scanner, other laser-based scanners or metrology systems, and the like.

Referring again to FIG. 2, in one or more examples, the scanner 246 of the first metrology system 148 and the second metrology system 108 captures the geometry (e.g., size and shape), contour (e.g., curvature), physical features (e.g., holes, edges, etc.), and other details of the composite workpiece 102. Scan data (e.g., measurement data) generated the scanner 246 is used by a computer to generate a model of the composite workpiece 102. The model of the composite workpiece 102 is a digital three-dimensional representation of the composite workpiece 102.

In one or more examples, the system 100 includes a computing device 110. The computing device 110 is adapted to manipulate the scanned measurement data representing the composite workpiece 102 (e.g., the as-built measurement data 146, the real-time measurement data 132, etc.) and/or to generate models representing the composite workpiece 102 (e.g., the as-built model 116, the real-time model 112, etc.) based on the scanned measurement data generated by the scanner 246.

In one or more examples, the computing device 110 is operable to generate the as-built model 116 from the as-built measurement data 146 generated by the first metrology system 148. The as-built model 116 is representative of the composite workpiece 102 having the as-built shape 118, for example, as formed and/or cured on the tool 150.

In one or more examples, the computing device 110 is operable to generate the real-time model 112 from the real-time measurement data 132 generated by the second metrology system 108. The real-time model 112 is representative of the composite workpiece 102 having the real-time shape 114, for example, as held by the workpiece holders 222.

In one or more examples, the workpiece holders 222 are selectively controlled (e.g., by instructions provided by the computing device 110) to index the composite workpiece 102 within one of the work cells 202 (e.g., the second work cell 206). For example, the computing device 110 is programmed with an indexed position 196 (e.g., as shown in FIGS. 13 and 14) of the composite workpiece 102 based on a predetermined virtual indexed position 172 (e.g., as shown in FIG. 13) of the as-built model 116 in the second work cell 206. The computing device 110 is operable to instruct the workpiece holders 222 to move the composite workpiece 102 to the indexed position 196 (e.g., as shown in FIGS. 13 and 14).

In one or more examples, the computing device 110 is operable to compare the real-time model 112 to the as-built model 116. Comparison of the real-time model 112 to the as-built model 116 determines whether the composite workpiece 102 is appropriately indexed in the second work cell 206. In situations where the comparison of the real-time model 112 to the as-built model 116 indicates that the composite workpiece 102 is not appropriately indexed, the computing device 110 is operable to instruct the workpiece holders 222 to adjust the position of the composite workpiece 102 in the second work cell 206 based on the comparison, such that the composite workpiece 102 is appropriately indexed.

In one or more examples, at least one of the workpiece holders 222 is selectively controlled (e.g., by instructions provided by the computing device 110) to conform the real-time shape 114 of the composite workpiece 102 to the as-built shape 118 of the composite workpiece 102. For example, the computing device 110 is programmed with numerical control location 140 for each one of the numerical control contacts 136 based on the as-built model 116. The computing device 110 instructs each one of the numerical control contacts 136 to extend or retract to the numerical control location 140 (e.g., as shown in FIG. 10) and instructs each one of the force control contacts 138 to extend and apply the shaping force 142 to the composite workpiece 102.

In one or more examples, the computing device 110 is operable to compare the real-time model 112 to the as-built model 116. Comparison of the real-time model 112 to the as-built model 116 determines whether the real-time shape 114 of the composite workpiece 102 is conformed to the as-built shape 118 of the composite workpiece 102. In situations where the comparison indicates that the real-time shape 114 of the composite workpiece 102 is not conformed (e.g., does not substantially match) the as-built shape 118 of the composite workpiece 102, the computing device 110 is operable to modify the numerical control location 140 of at least one of the numerical control contacts 136 of at least one of the workpiece holders 222 based on the comparison, such that the real-time shape 114 of the composite workpiece 102 is conformed (e.g., not substantially matches) the as-built shape 118 of the composite workpiece 102.

The computing device 110 may include a single computer or several interconnected computers. For example, the computing device 110 may include any collection of computing devices that individually or jointly execute a set (or multiple sets) of instructions to implement any one or more of the operations discussed herein. The computing device 110 includes a processor 240 (e.g., at least one processing unit) that is coupled to memory 242. The memory 242 includes program code 244 that is executable by the processor 240 to perform one or more operations.

Generally, as used herein, the phrase "the computing device 110 is adapted to" refers to the computing device 110 being configured or otherwise operable to perform a function, such as the program code 244 being executed by the processor 240 to perform a desired operation or function. The program code 244 is any coded instructions that is (e.g., computer readable and/or machine readable. The memory 242 is any a non-transitory computer readable and/or machine readable medium, such as a hard disk drive, flash memory, read-only memory, a compact disk, a digital versatile disk, a cache, random-access memory, and/or any other storage device or storage disk in which information is stored for any duration (e.g., for extended time periods, permanently, for brief instances, for temporarily buffering, and/or for caching of the information).

In one or more examples, the computing device 110 is adapted to perform various transforms (e.g., rigid body transforms and/or coordinate frame transforms) and/or other data manipulation operations (e.g., global best fit operations) to virtually compare the real-time model 112 to the as-built model 116. For example, the computing device 110 determines at least one of a translation and a rotation required to transform the real-time model 112 to the as-built model 116. In one or more examples, the translation and/or rotation determined by the transform is used by the computing device 110 to appropriately reposition the workpiece holders 222, such that the composite workpiece 102 is appropriately indexed. In one or more examples, the translation and/or rotation determined by the transform is used by the computing device 110 to determine a modification for the numerical control location 140 of one or more of the numerical control contacts 136, such that the real-time shape 114 of the composite workpiece 102 is conformed to the as-built shape 118 of the composite workpiece 102.

Referring now to FIG. 14, in one or more examples, the system 100 includes a machine tool 134. The machine tool 134 is positioned (e.g., located and/or oriented) in one of the work cells 202 (e.g., the second work cell 206). The machine tool 134 performs at least one machining operation on the composite workpiece 102 while the composite workpiece 102 is indexed and held in the as-built shape 118 by the workpiece holders 222.

Referring to FIGS. 3, 4, 13 and 14, in one or more examples, the system 100 includes a damping apparatus 174. In one or more examples, the damping apparatus 174 is positioned (e.g., located and/or oriented) between a directly adjacent pair of the workpiece holders 222. The damping apparatus 174 is coupled to the composite workpiece 102. In one or more examples, the damping apparatus 174 is coupled to the first surface 144 of the composite workpiece 102 while the composite workpiece 102 is held (e.g., clamped and conformed) by the workpiece holders 222 (e.g., as shown in FIGS. 4, 13 and 14). The damping apparatus 174 reduces vibration in the composite workpiece 102 during the machining operation performed by the machine tool 134 (e.g., as shown in FIG. 14). Coupling the damping apparatus 174 to the composite workpiece 102 increases a mass of the composite workpiece 102 at a localized area of the composite workpiece 102, thereby reducing the vibrations induced in the composite workpiece 102 by the machine tool 134.

Referring again to FIG. 14, in one or more examples, the second metrology system 108 digitizes the composite workpiece 102 during and/or after performing the post-cure processing operation and while the composite workpiece 102 is held by the workpiece holders 222. In one or more examples, the second metrology system 108 generates as-machined measurement data 176 (e.g., as shown in FIG. 2) after the machining operation, for example, performed by the machine tool 134. Accordingly, the second metrology system 108 may also be referred to as an as-machined metrology system. The as-machined measurement data 176 represents at least a portion of the composite workpiece 102 while the composite workpiece 102 is held by the workpiece holders 222 and has the as-machined shape 178 after the machining operation.

In an example, the second metrology system 108 digitizes at least the second surface 238 of the composite workpiece 102 such that the as-machined measurement data 176 represents the shape, contour, previous features (e.g., prior formed edges, holes, etc.) and newly added features (e.g., newly formed edges, holes, etc.) of the second surface 238 of the composite workpiece 102. In another example, the second metrology system 108 digitizes the first surface 144 and the second surface 238 of the composite workpiece 102 such that the real-time measurement data 132 represents the shape, contour, previous features (e.g., prior formed edges, holes, etc.), and newly added features (e.g., newly formed edges, holes, etc.) of the first surface 144 and the second surface 238 of the composite workpiece 102.

In one or more examples, the as-machined measurement data 176 is used to generate an as-machined model 180 (e.g., as shown in FIG. 2) that is representative of the composite workpiece 102 having the as-machined shape 178. Accordingly, the as-machined model 180 represents an update to the as-built model 116, which includes features formed during the machining operation.

In one or more examples, the computing device 110 is operable to generate the as-machined model 180 from the as-machined measurement data 176 generated by the second metrology system 108. The as-machined model 180 is representative of the composite workpiece 102 having the as-machined shape 178, for example, having the as-built shape 118 and newly added features as held by the workpiece holders 222.

Referring now to FIGS. 1 and 17, in one or more examples, at least a portion of the system 100 is associated with the third work cell 208. In one or more examples, the third work cell 208 receives the composite workpiece 102 from the second work cell 206 after the machining operation is performed in the second work cell 206 (e.g., as shown in FIG. 16).

In one or more examples, the system 100 includes a plurality of second workpiece holders 182. In one or more examples, the workpiece holder 106 (e.g., as described herein above and shown in FIGS. 5-11) is an example of at least one of the second workpiece holders 182. In some examples, each one of the second workpiece holders 182 is substantially the same, for example, includes substantially the same features and/or operates substantially the same, as the workpiece holder 106. In other examples, one or more of the second workpiece holders 182 is different, for example, includes different features and/or operates different, than as the example of the workpiece holder 106.

The second workpiece holders 182 clamp the composite workpiece 102 and hold the composite workpiece 102 in the third work cell 208 for performance of a subsequent post-cure processing operation. For example, with the composite workpiece 102 held by the second workpiece holders 182, the second workpiece holders 182 appropriately position the composite workpiece 102 in the third work cell 208 for performance of the subsequent post-cure processing operation (e.g., machining, drilling, trimming, etc.).

In one or more examples, the second workpiece holders 182 are selectively controlled to index the composite workpiece 102 in the third work cell 208, based on a comparison of the real-time model 112, generated in the third work cell 208, to the as-machined model 180, generated in the second work cell 206. Alternatively, the second workpiece holders 182 are selectively controlled to index the composite workpiece 102 in the third work cell 208, based on a comparison of the real-time model 112, generated in the third work cell 208, to the as-built model 116, generated in the first work cell 204.

In one or more examples, the second workpiece holders 182 are selectively controlled to conform the composite workpiece 102 to the as-machined shape 178, based on a comparison of the real-time model 112, generated in the third work cell 208, to the as-machined model 180, generated in the second work cell 206. Alternatively, the second workpiece holders 182 are selectively controlled to conform the composite workpiece 102 to the as-built shape 118, based on a comparison of the real-time model 112, generated in the third work cell 208, to the as-built model 116, generated in the first work cell 204.

It can be appreciated that this process may be repeated as the composite workpiece 102 moves through the other work cells 202 of the manufacturing environment 200. For example, workpiece holders associated with each one of the work cells 202 hold the composite workpiece 102 during performance of a subsequent post-cure processing operation, index the composite workpiece 102 before performing the subsequent post-cure processing operation, and conform the composite workpiece 102 to the as-built shape 118, or to the as-machined shape 178 of an immediately prior one of the work cells 202, before performing the subsequent post-cure processing operation. Additionally, the as-machined model 180 may be generated or updated after each subsequent post-cure processing operation, such that, upon completion of all post-cure processing operations, the as-machined model 180 represents the composite workpiece 102 having the as-built shape 118 and all the machined features. As such, the composite workpiece 102 fabricated in this manner may be used for determinant assembly or predictive assembly of another structure, such as the wing 1220 of the aircraft 1200 (e.g., as shown in FIG. 20).

Referring now to FIGS. 13, 14, 16 and 17, in one or more examples, the system 100 includes an overhead workpiece handler 166. The overhead workpiece handler 166 is coupled to the composite workpiece 102. The overhead workpiece handler 166 supports the composite workpiece 102 while transporting the composite workpiece 102 between the work cells 202.

In one or more examples, with the composite workpiece 102 released from the clamp 120 of each one of the workpiece holders 222, the overhead workpiece handler 166 transports the composite workpiece 102 between the work cells 202 of the manufacturing environment 200. For example, the overhead workpiece handler 166 transports the composite workpiece 102 from the second work cell 206, following the post-cure processing operation, to the third work cell 208 for performance of a subsequent processing operation, and so on. In one or more examples, the overhead workpiece handler 166 carries the composite workpiece in the approximately vertical orientation.

In one or more examples, the overhead workpiece handler 166 also supports the composite workpiece 102 during the post-cure processing operation and while the composite workpiece 102 is held by the workpiece holders 222 (or the second workpiece holders 182, third workpiece holders, etc.). For example, the overhead workpiece handler 166 supports the composite workpiece 102 during periods where at least a portion of the composite workpiece 102 is unclamped from at least one of the workpiece holders 222, for example, during relocating or reorienting at least one of the workpiece holders 222 relative to the composite workpiece 102 or during adjustment of at least one of the numerical control contacts 136 of at least one of the workpiece holders 222 to conform the composite workpiece 102 to the as-built shape 118.

In one or more examples, with the composite workpiece 102 coupled to the overhead workpiece handler 166 and released from the clamp 120 of the workpiece holder 106 (e.g., at least one of the workpiece holders 222), the drive mechanism 130 of the workpiece holder 106 rotates the clamp 120 about the second rotation axis 186 relative to the base 128 of the workpiece holder 106 to angularly orient the first jaw 122 and the second jaw 126 of the clamp 120 relative to the composite workpiece 102.

In one or more examples, with the composite workpiece 102 coupled to the overhead workpiece handler 166 and held by the clamp 120 of the workpiece holder 106 (e.g., at least one of the workpiece holders 222), the drive mechanism 130 of the workpiece holder 106 linearly moves the clamp 120 along the first translation axis 188 to horizontally position the composite workpiece 102 in one of the work cells 202.

In one or more examples, with the composite workpiece 102 coupled to the overhead workpiece handler 166 and released from the clamp 120 of the workpiece holder 106 (e.g., at least one of the workpiece holders 222), the workpiece holder 106 linearly moves along the second translation axis 190 to position the first jaw 122 and the second jaw 126 of the clamp 120 relative to the composite workpiece 102.

In one or more examples, the overhead workpiece handler 166 includes a support beam 168 and a plurality of hangers 170. The hangers 170 are connected to the support beam 168 and to the composite workpiece 102 such that the composite workpiece 102 is suspended from the support beam 168, such as in the approximately vertical orientation.

In one or more examples, the hangers 170 are connected to the composite workpiece 102 at, or using, holes 248 machined in the composite workpiece, such that the composite workpiece 102 is suspended from the hangers 170 by the holes 248. In one or more examples, the holes 248 are machined through the composite workpiece 102 while the composite workpiece 102 is on the tool 150 (e.g., in the first work cell 204) and has the as-built shape 118. In one or more examples, the holes 248 are represented in the as-built model 116 and in the real-time model 112 and are used as alignment features during comparison (e.g., transform) of the real-time model 112 to the as-built model 116 for indexing the composite workpiece 102 and/or for conforming the composite workpiece 102 to the as-built shape 118.

Referring now to FIGS. 12 and 15, in one or more examples, the system 100 includes a material handler 194. The material handler 194 demolds (e.g., separates and removes) the composite workpiece 102 from the tool 150. In one or more examples, the material handler 194 transports the composite workpiece 102 directly to the workpiece holders 222 (e.g., as shown in FIG. 15). For example, the material handler 194 demolds the composite workpiece 102 from the tool 150 in the first work cell 204 and transports the composite workpiece 102 to the workpiece holders 222 associated with the second work cell 206. In one or more examples, the composite workpiece 102 is coupled to the overhead workpiece handler 166 while the composite workpiece 102 is held by the workpiece holders 222, for example, in the second work cell 206.

In one or more examples, the material handler 194 transports the composite workpiece 102 in the approximately horizontal orientation. The clamp 120 of the workpiece holder 106 (e.g., each one of the workpiece holders 222) receives the composite workpiece 102 from the material handler 194 with the composite workpiece 102 in the approximately horizontal orientation.

In one or more examples, the overhead workpiece handler 166 receives the composite workpiece 102 from the material handler 194 and transports the composite workpiece 102 from the first work cell 204 to the second work cell 206.

The present disclosure is also directed to a method for handling the composite workpiece 102 using the system 100. The present disclosure is further directed to the composite workpiece 102 manufactured using the system 100. The present disclosure is additionally directed to the system 100 for handling the composite workpiece 102 that includes the workpiece holder 106 (e.g., at least one of the workpiece holders 222). The present disclosure is also directed to the workpiece holder 106, such as the plurality of workpiece holders 222, for handling the composite workpiece 102, for example, in at least one of the work cells 202 of the manufacturing environment 200.

Figure 18:
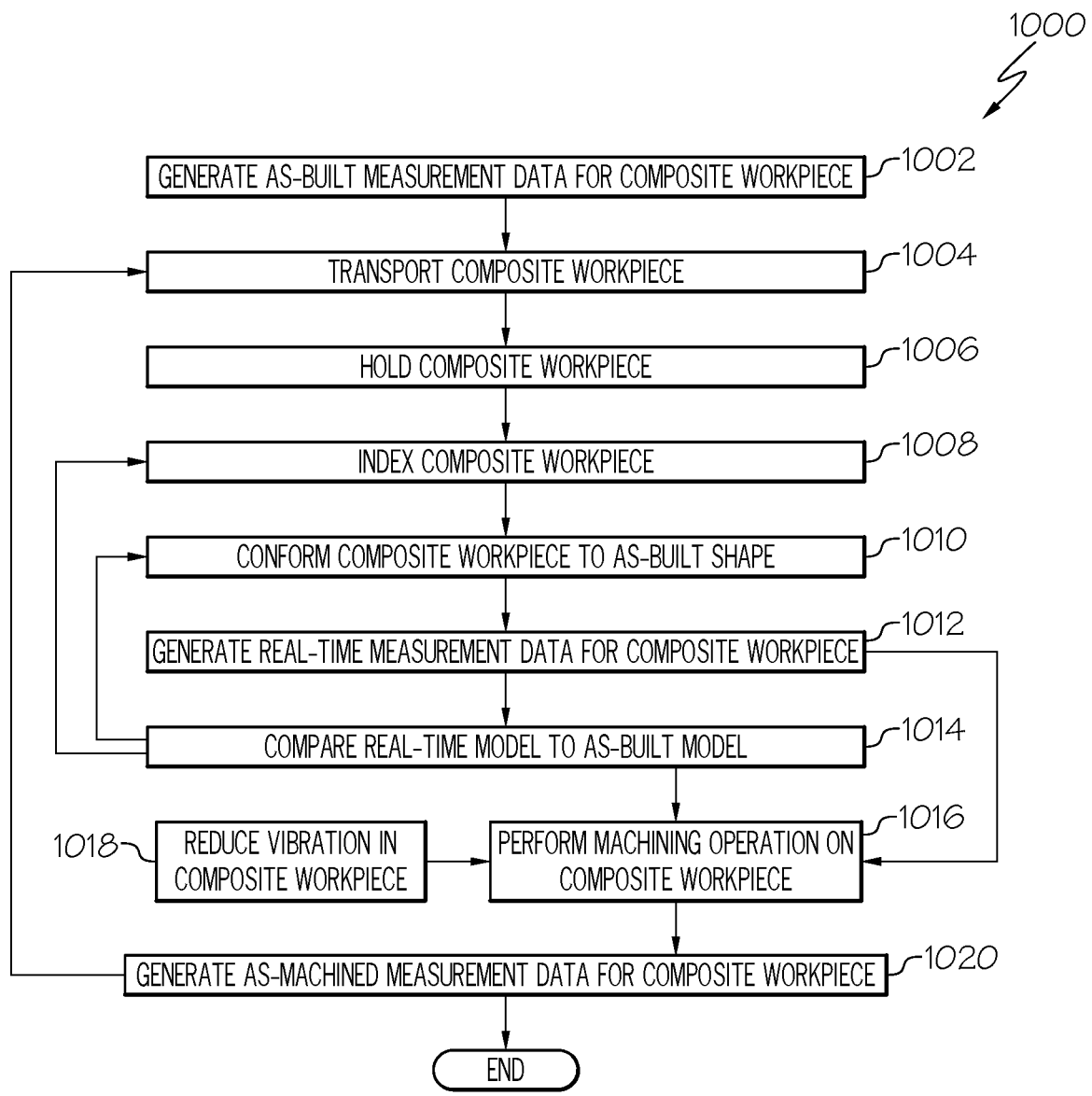
FIG. 18 is a flow diagram of an example of a method for handling the composite workpiece.

Referring generally to FIGS. 1-17 and particularly to FIG. 18, by way of examples, the present disclosure is also directed to a method 1000 for handling the composite workpiece 102. The method 1000 for handling the composite workpiece 102 is implements during, or forms a portion of, a method for post-cure processing of the composite workpiece 102. In one or more examples, the method 1000 is implemented using the system 100.

Generally, the method 1000 includes, or begins with, a step of forming a composite layup on a tool surface of the tool 150. Alternatively, the method 1000 includes a step of forming the composite layup on a dedicate layup tool and a step of transferring the composite layup to the tool 150 for curing. The method 1000 also includes a step of curing the composite layup (e.g., an uncured or "green" composite) on the tool 150 to form the composite workpiece 102 (e.g., a cured composite).

In one or more examples, the method 1000 includes a step of performing at least one (e.g., an initial) post-cure processing operation on the composite workpiece 102 while the composite workpiece 102 is on the tool 150 and has the as-built shape 118. For example, the holes 248 may be machined (e.g., drilled) through the composite workpiece 102, while the composite workpiece 102 is on the tool 150 and has the as-built shape 118.

In one or more examples, the method 1000 includes a step of digitizing at least a portion of the composite workpiece 102 while the composite workpiece 102 is on the tool 150. In one or more examples, the step of digitizing the composite workpiece 102 includes a step of (block 1002) generating the as-built measurement data 146 for the composite workpiece 102. In one or more examples, the as-built measurement data 146 is generated using the first metrology system 148. In one or more examples, the as-built measurement data 146 is generated while the composite workpiece 102 is on the tool 150 and has the as-built shape 118. In one or more examples, the step of digitizing at least a portion of the composite workpiece 102 includes a step of generating the as-built model 116 using the as-built measurement data 146.

In one or more examples, the method 1000 includes a step of demolding the composite workpiece 102 from the tool 150. In one or more examples, the step of demolding the composite workpiece 102 includes a step of separating the composite workpiece 102 from the tool surface and a step of removing the composite workpiece 102 from the tool 150. In one or more examples, the step of demolding is preformed automatically or semi-automatically using the material handler 194. In one or more examples, the step of demolding is performed manually.

In one or more examples, the method 1000 includes a step of (block 1004) transporting the composite workpiece 102. For example, the composite workpiece 102 is transported from one of the work cells 202 (e.g., the first work cell 204) to another one of the work cells 202 (e.g., the second work cell 206) of the manufacturing environment 200.

In one or more examples, the composite workpiece 102 is transported from one of the work cells 202 (e.g., the first work cell 204) to another one of the work cells 202 (e.g., the second work cell 206) using the material handler 194. In one or more examples, the composite workpiece 102 is transported from one of the work cells 202 (e.g., the second work cell 206) to another one of the work cells 202 (e.g., the third work cell 208) using the overhead workpiece handler 166.

In one or more examples, the method 1000 includes a step of (block 1006) holding the composite workpiece 102. In one or more examples, the composite workpiece 102 is held using the workpiece holder 106 (e.g., at least one of the workpiece holders 222). For example, the composite workpiece 102 is held in one of the work cells 202 (e.g., the second work cell 206) using the workpiece holders 222.

In one or more examples, according to the method 1000, the step of (block 1006) holding the composite workpiece 102 includes a step of clamping the composite workpiece 102 using the clamp 120 of the workpiece holder 106 (e.g., each one of the workpiece holders 222). For example, the composite workpiece 102 is clamped between the first jaw 122 and the second jaw 126 of the clamp 120 of the workpiece holder 106 (e.g., at least one of the workpiece holders 222).

In one or more examples, the method 1000 includes a step of (block 1008) indexing the composite workpiece 102. In one or more examples, the composite workpiece 102 is indexed using the workpiece holder 106 (e.g., at least one of the workpiece holders 222). For example, the composite workpiece 102 is indexed in (e.g., relative to) one of the work cells 202 (e.g., the second work cell 206) by selectively controlling the workpiece holder 106 (e.g., at least one of the workpiece holders 222).

In one or more examples, according to the method 1000, the step of (block 1008) indexing the composite workpiece 102 in the work cell 206 includes a step of positioning the composite workpiece 102 in the indexed position 196 in the work cell 206 based on the virtual indexed position 172 of the as-built model 116 of the composite workpiece 102 in the work cell 206.

In one or more examples, according to the method 1000, the step of (block 1008) indexing the composite workpiece 102 in the work cell 206 also includes a step of generating the real-time model 112 of the composite workpiece 102 that is representative of a real-time position 192 of the composite workpiece 102 in the work cell 206. The step of (block 1008) indexing the composite workpiece 102 in the work cell 206 further includes a step of comparing the real-time position 192 of the real-time model 112 to the virtual indexed position 172 of the as-built model 116. The step of (block 1008) indexing the composite workpiece 102 in the work cell 206 additionally includes a step of repositioning the composite workpiece 102 in the indexed position 196 in the work cell 206 based on a comparison of the real-time position 192 and the virtual indexed position 172.

In one or more examples, according to the method 1000, the step of (block 1008) indexing the composite workpiece 102 includes a step of moving the clamp 120 of the workpiece holder 106 (e.g., at least one of the workpiece holders 222) relative to the base 128 of the workpiece holder 106 based on the indexed (e.g., nominal) position of the as-built model 116 of the composite workpiece 102.

In one or more examples, the method 1000 includes a step of (block 1010) conforming the composite workpiece 102 to the as-built shape 118 of the composite workpiece 102. In one or more examples, the composite workpiece 102 is conformed to the as-built shape 118 using the workpiece holder 106 (e.g., at least one of the workpiece holders 222). For example, the composite workpiece 102 is conformed to the as-built shape 118 by selectively controlling the workpiece holder 106 (e.g., at least one of the workpiece holders 222).

In one or more examples, according to the method 1000, the step of (block 1010) conforming the composite workpiece 102 to the as-built shape 118 of the composite workpiece 102 includes a step of determining a plurality of coordinate locations on the first surface 144 of the composite workpiece 102 represented by the as-built model 116 of the composite workpiece 102. The step of (block 1010) conforming the composite workpiece 102 to the as-built shape 118 of the composite workpiece 102 also includes a step of shaping the composite workpiece 102 to align the first surface 144 of the composite workpiece 102 with the plurality of coordinate locations.

Generally, the plurality of coordinate locations is representative of a shape or contour of the first surface 144 of the composite workpiece 102 with the composite workpiece 102 in the as-built shape 118. The step of shaping the composite workpiece 102 to align the first surface 144 of the composite workpiece 102 with the plurality of coordinate locations shapes or positions the first surface 144 of the composite workpiece 102 in the as-built shape 118.

In one or more examples, according to the method 1000, the step of shaping the composite workpiece 102 to align the first surface 144 of the composite workpiece 102 with the plurality of coordinate locations includes a step of moving each one of the plurality of numerical control contacts 136 relative to the first jaw 122 of the clamp 120 of each one of the plurality of workpiece holders 222 to a corresponding one of the plurality of numerical control locations 140 that correspond to the plurality of coordinate locations on the first surface 144. The step of shaping the composite workpiece 102 to align the first surface 144 of the composite workpiece 102 with the plurality of coordinate locations also includes a step of moving each one of the plurality of force control contacts 138 relative to the second jaw 126 of the clamp 120 each one of the plurality of workpiece holders 222 to force the first surface 144 of the composite workpiece 102 against the plurality of numerical control contacts 136.

For example, the step of (block 1010) conforming the composite workpiece 102 to the as-built shape 118 includes a step of moving each one of numerical control contacts 136 of the workpiece holder 106 (e.g., at least one of the workpiece holders 222) relative to the first jaw 122 of the workpiece holder 106. Each one of the numerical control contacts 136 is moved to the numerical control location 140 based on the as-built shape 118 of the composite workpiece 102. In one or more examples, the numerical control location 140 of each one of the numerical control contacts 136 corresponds to a coordinate location on the first surface 144 of the composite workpiece 102, which is represented by the as-built model 116 of the composite workpiece 102.

For example, the step of (block 1010) conforming the composite workpiece 102 to the as-built shape 118 also includes a step of moving each one of the force control contacts 138 of the workpiece holder 106 (e.g., at least one of the workpiece holders 222) relative to the second jaw 126 of the workpiece holder 106. Each one of the force control contacts 138 applies (e.g., is moved to apply) the shaping force 142 to the composite workpiece 102. In one or more examples, the method 1000 also includes a step of limiting the shaping force 142 to be less than or equal to the threshold force.

For example, the step of (block 1010) conforming the composite workpiece 102 to the as-built shape 118 includes a step of urging, or forcing, the composite workpiece 102 against the numerical control contacts 136 to conform the composite workpiece 102 to the as-built shape 118 of the composite workpiece 102.

In one or more examples, according to the method 1000, the step of (block 1010) conforming the composite workpiece 102 to the as-built shape 118 of the composite workpiece 102 includes a step of generating the real-time model 112 of the composite workpiece 102 that is representative of a real-time shape 114 of the composite workpiece 102 in the work cell 206 as held by the plurality of workpiece holders 222. The step of (block 1010) conforming the composite workpiece 102 to the as-built shape 118 of the composite workpiece 102 also includes a step of comparing the real-time shape 114 of the real-time model 112 to the as-built shape 118 of the as-built model 116. The step of (block 1010) conforming the composite workpiece 102 to the as-built shape 118 of the composite workpiece 102 further includes a step of modifying at least one of the numerical control locations 140 based on a comparison of the real-time model 112 to the as-built model 116.

In one or more examples, the method 1000 includes a step of digitizing at least a portion of the composite workpiece 102 while the composite workpiece 102 is held by the workpiece holders 222. In one or more examples, the step of digitizing at least a portion of the composite workpiece 102 includes a step of (block 1012) generating the real-time measurement data 132 for the composite workpiece 102. In one or more examples, the real-time measurement data 132 is generated using the second metrology system 108. In one or more examples, the real-time measurement data 132 is generated while the composite workpiece 102 is held by the workpiece holders 222 and has the real-time shape 114. In one or more examples, the step of digitizing at least a portion of the composite workpiece 102 includes a step of generating the real-time model 112 using the real-time measurement data 132.

In one or more examples, the method 1000 includes a step of (block 1014) comparing the real-time model 112 (or the real-time measurement data 132) to the as-built model 116 (or the as-built measurement data 146). In one or more examples, step of (block 1014) comparing the real-time model 112 to the as-built model 116 includes a step of determining a transform that fits the real-time model 112 to the as-built model 116.

In one or more examples, the method 1000 includes a step of confirming that the composite workpiece 102 is appropriately indexed based on the comparison of the real-time model 112 to the as-built model 116. In one or more examples, the method 1000 includes a step of confirming that the composite workpiece 102 is conformed to the as-built shape 118 based on the comparison of the real-time model 112 to the as-built model 116.

In one or more examples, the step of (block 1008) indexing the composite workpiece 102 includes a step of moving (e.g., repositioning) the clamp 120 of the workpiece holder 106 (e.g., at least one of the workpiece holders 222)

and/or the base 128 of the workpiece holder 106 based on the comparison of the real-time model 112 to the as-built model 116.

In one or more examples, the step of (block 1010) conforming the composite workpiece 102 to the as-built shape 118 includes a step of modifying the numerical control location 140 of at least one of the numerical control contacts 136 of the workpiece holder 106 (e.g., at least one of the of workpiece holders 222) based on the comparison of the real-time model 112 to the as-built model 116.

In one or more examples, the method 1000 includes a step of (block 1016) performing a machining operation on the composite workpiece 102 while the composite workpiece 102 is held in the indexed position 196 and in the as-built shape 118 by the workpiece holders 222. In one or more examples, the machining operation is automatically performed using the machine tool 134, for example, under direction from the computing device 110.

In one or more examples, the method 1000 includes a step of (block 1018) reducing vibration in the composite workpiece 102 while performing the machining operation. In one or more examples, vibrations in the composite workpiece 102 are reduced using the damping apparatus 174, which is coupled to the composite workpiece 102.

In one or more examples, the method 1000 includes a step of coupling the damping apparatus 174 to the composite workpiece 102. In one or more examples, the damping apparatus 174 is coupled to the composite workpiece 102 between a directly adjacent pair of the workpiece holders 222. Generally, damping apparatus 174 is coupled to the composite workpiece 102 before performing the step of (block 1016) performing the machining operation on the composite workpiece 102.

In one or more examples, the method 1000 includes a step of suspending the composite workpiece 102, for example, in the approximately vertical orientation. In one or more examples, the composite workpiece 102 is suspended from the overhead workpiece handler 166.

In one or more examples, with the composite workpiece 102 coupled to the overhead workpiece handler 166, the method 1000 includes a step of unclamping the composite workpiece 102 from the clamp 120 of the workpiece holder 106 (e.g., at least one of the workpiece holders 222). The method 1000 includes a step of rotationally moving the clamp 120 of the workpiece holder 106 (e.g., at least one of the workpiece holders 222) relative to the base 128 of the workpiece holder 106 to angularly orient the first jaw 122 and the second jaw 126 relative to the composite workpiece 102. These steps may be used to reposition the clamp 120 so that the composite workpiece 102 is appropriately indexed (e.g., block 1008) or so that the composite workpiece 102 appropriately conformed to the as-built shape 118 (e.g., block 1010).

In one or more examples, with the composite workpiece 102 coupled to the overhead workpiece handler 166, the method 1000 includes a step of unclamping the composite workpiece 102 from the clamp 120 of the workpiece holder 106 (e.g., at least one of the workpiece holders 222. The method 1000 includes a step of linearly moving the workpiece holder 106 (e.g., at least one of the workpiece holders 222) to position the first jaw 122 and the second jaw 126 of the clamp 120 relative to the composite workpiece 102. These steps may be used to reposition the clamp 120 so that the composite workpiece 102 is appropriately indexed (e.g., block 1008) or so that the composite workpiece 102 appropriately conformed to the as-built shape 118 (e.g., block 1010).

In one or more examples, the method 1000 includes a step of digitizing at least a portion of the composite workpiece 102 after the machining operation (e.g., block 1016). In one or more examples, the step of digitizing at least a portion of the composite workpiece 102 includes a step of (block 1020) generating the as-machined measurement data 176 for the composite workpiece 102. In one or more examples, the as-machined measurement data 176 is generated using the second metrology system 108. In one or more examples, the as-machined measurement data 176 is generated while the composite workpiece 102 is held by the workpiece holders 222 and has the as-machined shape 178 (e.g., the as-built shape 118 updated with newly added features). In one or more examples, the step of digitizing at least a portion of the composite workpiece 102 includes a step of generating the as-machined model 180 using the as-machined measurement data 176.

In one or more examples, at least a portion of the steps described above are repeated a number of times as the composite workpiece 102 moves through the work cells 202 and a number of post-processing operations are performed on the composite workpiece 102.

The present disclosure is also directed to the system 100 for handling the composite workpiece 102, which is implemented according to the method 1000. The present disclosure is further directed to the composite workpiece 102 that is manufacturing according to the method 1000.

Figure 19:
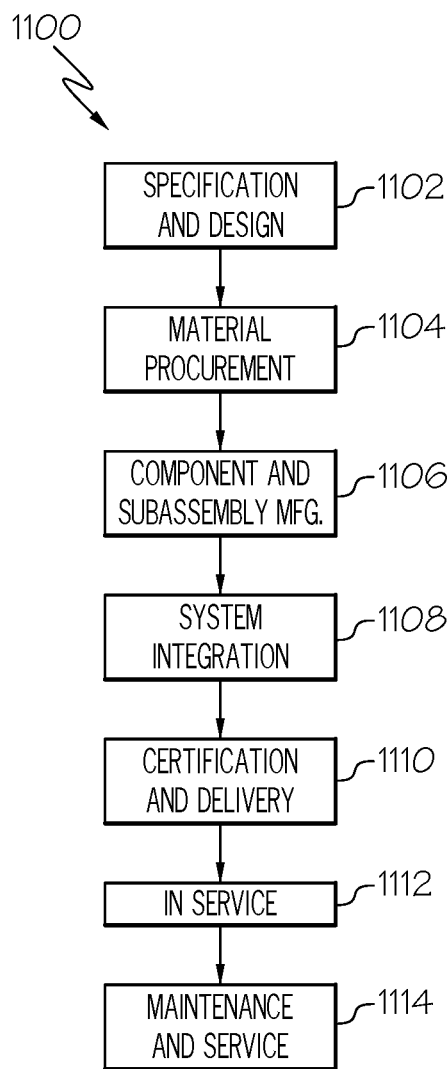
FIG. 19 is a flow diagram of an example of an aircraft manufacturing and service method.

Referring now to FIGS. 19 and 20, examples of the system 100, the method 1000, and the composite workpiece 102 may be related to, or used in the context of, an aircraft manufacturing and service method 1100, as shown in the flow diagram of FIG. 19 and the aircraft 1200, as schematically illustrated in FIG. 20. For example, the aircraft 1200 and/or the aircraft production and service method 1100 may utilize the composite workpiece 102 that is held and machined using the system 100, described herein and illustrated in FIGS. 1-17, and/or according to the method 1000, described herein and illustrated in FIG. 18.

Referring to FIG. 20, examples of the aircraft 1200 may include an airframe 1202 having the interior 1206. The aircraft 1200 also includes a plurality of high-level systems 1204. Examples of the high-level systems 1204 include one or more of a propulsion system 1208, an electrical system 1210, a hydraulic system 1212, an environmental system 1214, and a flight control system 1216. In other examples, the aircraft 1200 may include any number of other types of systems, such as a communications system, a guidance system, a weapons system, and the like. In one or more examples, the composite workpiece 102 made (e.g., held, machined and/or processed) using the system 100 and/or according to the method 1000 forms a component of the airframe 1202, such as a wing 1220, a fuselage 1218, a tail 1224, a vertical stabilizer 1226, a horizontal stabilizer 1228 or a panel, a stringer, a spar, or another component thereof.

Referring to FIG. 19, during pre-production, the service method 1100 includes specification and design of the aircraft 1200 (block 1102) and material procurement (block 1104). During production of the aircraft 1200, component and subassembly manufacturing (block 1106) and system integration (block 1108) of the aircraft 1200 take place. Thereafter, the aircraft 1200 goes through certification and delivery (block 1110) to be placed in service (block 1112). Routine maintenance and service (block 1114) includes modification, reconfiguration, refurbishment, etc. of one or more systems of the aircraft 1200.

Each of the processes of the service method 1100 illustrated in FIG. 19 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

Examples of the system 100 and the method 1000 shown and described herein may be employed during any one or more of the stages of the manufacturing and service method 1100 shown in the flow diagram illustrated by FIG. 19. In an example, manufacture of the composite workpiece 102 in accordance with the method 1000 and/or using the system 100 may form a portion of component and subassembly manufacturing (block 1106) and/or system integration (block 1108). Further, the composite workpiece 102 manufactured in accordance with the method 1000 and/or using the system 100 may be utilized in a manner similar to components or subassemblies prepared while the aircraft 1200 is in service (block 1112). Also, the composite workpiece 102 manufactured in accordance with the method 1000 and/or using the system 100 may be utilized during system integration (block 1108) and certification and delivery (block 1110). Similarly, manufacture of the composite workpiece 102 in accordance with the method 1000 and/or using the system 100 may be utilized, for example and without limitation, while the aircraft 1200 is in service (block 1112) and during maintenance and service (block 1114). For example, spare and or replacement composite parts may be fabricated in accordance with the method 1000 and/or using the system 100, which may be installed due to a prescribed maintenance cycle or after a realization of damage to a composite part.

In can be appreciated that performing at least a portion of the post-cure processing operation on the composite workpiece 102 while the composite workpiece 102 is held, indexed, and conformed to the as-built shape 118 by the workpiece holders (e.g., workpiece holders 222, second workpiece holders 182, etc.) in one or more of the work cells 202, and updating the model of the composite workpiece 102 (e.g., the as-machined model 180) after each subsequent post-cure processing operation may improve the accuracy and speed of the processing operation and enable determinant or predictive assembly using the composite workpiece 102.

Although an aerospace example is shown, the examples and principles disclosed herein may be applied to other industries, such as the automotive industry, the space industry, the construction industry, and other design and manufacturing industries. Accordingly, in addition to aircraft, the examples and principles disclosed herein may apply to composite structures, systems, and methods of making the same for other types of vehicles (e.g., land vehicles, marine vehicles, space vehicles, etc.) and stand-alone structures.

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component or step preceded with the word "a" or "an" should be understood as not excluding a plurality of features, elements, components or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

For the purpose of the present disclosure, the term "position" of an item refers to a location of the item in three-dimensional space relative to a fixed reference frame and an angular orientation of the item in three-dimensional space relative to the fixed reference frame.

As used herein, relative positional (e.g., locational and/or orientational) terms, such as parallel, perpendicular, horizontal, vertical, and similar terms include approximations of such positional terms (e.g., approximately parallel, approximately perpendicular, approximately, vertical, approximately horizontal, etc.).

As used herein, the term "approximately" refers to or represent a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

Conditional language such as, among others, "can" or "may," unless specifically stated otherwise, are understood within the context as used to generally convey that a certain example includes, while other examples do not include, certain features, elements and/or steps. Thus, such conditional language is not generally intended to imply that features, elements and/or steps are in any way required for one or more examples or that one or more examples necessarily include logic for deciding, with or without user input or prompting, whether these features, elements and/or steps are included or are to be performed in any example.

FIGS. 1-17 and 20, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1-17 and 20, referred to above, need be included in every example and not all elements, features, and/or components described herein are necessarily depicted in each illustrative example. Accordingly, some of the elements, features, and/or components described and illustrated in FIGS. 1-17 and 20 may be combined in various ways without the need to include other features described and illustrated in FIGS. 1-17 and 20, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1-17 and 20, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1-17 and 20, and such elements, features, and/or components may not be discussed in detail herein with reference to each of FIGS. 1-17 and 20. Similarly, all elements, features, and/or components may not be labeled in each of FIGS. 1-17 and 20, but reference numerals associated therewith may be utilized herein for consistency.

In FIGS. 18 and 19, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 18 and 19 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the system 100, the workpiece holder 106, the method 1000, and the composite workpiece 102 have been shown and described, modifications may occur to those skilled in the art upon reading the specification. The present application includes such modifications and is limited only by the scope of the claims.

What is claimed is:

1. A system for handling a composite workpiece one of a plurality of work cells, wherein the system comprises:
   a plurality of workpiece holders to hold the composite workpiece in the one of the plurality of work cells; and
   a first metrology system that generates as-built measurement data for the composite workpiece,
   wherein:
   the as-built measurement data is used to generate an as-built model of the composite workpiece that is representative of the composite workpiece having an as-built shape;
   each one of the plurality of workpiece holders is selectively controlled to index the composite workpiece in the one of the plurality of work cells; and
   at least one of the plurality of workpiece holders comprises a clamp that is selectively controlled to conform the composite workpiece to the as-built shape of the composite workpiece.

2. The system of claim 1, wherein:
   the at least one of the plurality of workpiece holders further comprises a base;
   the clamp is coupled to the base and comprises:
      a first jaw;
      a support member coupled to the first jaw; and
      a second jaw coupled to the support member, the second jaw is movable along the support member relative to the first jaw to clamp the composite workpiece between the first jaw and the second jaw so that the composite workpiece has the as-built shape; and with the composite workpiece clamped between the first jaw and the second jaw, the clamp is movable relative to the base to index the composite workpiece.

3. The system of claim 2, wherein:
the second metrology system further generates as-machined measurement data after a machining operation;
the as-machined measurement data is representative of the composite workpiece having an as-machined shape; and
the computing device is further operable to generate an as-machined model,
from the as-machined measurement data, that is representative of the composite workpiece having the as-machined shape.

4. The system of claim 2, wherein:
the at least one of the plurality of workpiece holders further comprises:
a plurality of numerical control contacts located along the first jaw; and
a plurality of force control contacts located along the second jaw;
each one of the plurality of numerical control contacts is selectively extendable and retractable relative to the first jaw to a numerical control location based on the as-built shape of the composite workpiece;
each one of the plurality of force control contacts is selectively extendable and retractable relative to the second jaw to apply a shaping force to the composite workpiece; and
the shaping force, applied by each one of the plurality of force control contacts, forces the composite workpiece against the plurality of numerical control contacts to conform the composite workpiece to the as-built shape of the composite workpiece.

5. The system of claim 4, wherein each one of the plurality of numerical control contacts comprises:
a numerical control actuator;
a first vacuum gripper coupled to the numerical control actuator; and
a first actuator control unit that controls extension and retraction of the numerical control actuator to locate the first vacuum gripper at the numerical control location.

6. The system of claim 4, wherein each one of the plurality of force control contacts comprises:
a force control actuator;
a second vacuum gripper coupled to the force control actuator;
a force sensor that detects a load applied to the force control actuator; and
a second actuator control unit that controls extension and retraction of the force control actuator to apply the shaping force to the composite workpiece.

7. The system of claim 4, wherein the numerical control location of each one of the plurality of numerical control contacts corresponds to a coordinate location on a first surface of the composite workpiece represented by the as-built model of the composite workpiece.

8. The system of claim 1, wherein the as-built measurement data for the composite workpiece is generated while the composite workpiece is on a tool used to cure the composite workpiece.

9. The system of claim 1, further comprising a second metrology system that generates real-time measurement data for the composite workpiece while the composite workpiece is held by the plurality of workpiece holders,
wherein:
the real-time measurement data is representative of the composite workpiece having a real-time shape as held by the plurality of workpiece holders; and
the clamp of the at least one of the plurality of workpiece holders is selectively controlled to conform the real-time shape of the composite workpiece to the as-built shape of the composite workpiece.

10. The system of claim 9, further comprising a computing device that is operable to:
generate a real-time model from the real-time measurement data, wherein the real-time model is representative of the composite workpiece having the real-time shape as held by the plurality of workpiece holders;
compare the real-time model to the as-built model; and
selectively actuate the clamp of the at least one of the plurality of workpiece holders based on a comparison of the real-time model to the as-built model.

11. The system of claim 10, wherein:
the clamp comprises:
at least one numerical control contact; and
at least one force control contact opposite the at least one numerical control contact; and
the computing device is operable to:
selectively extend or retract the numerical control contact to a numerical control location based on the as-built shape; and
selectively extend or retract the force control contact to apply a shaping force to the composite workpiece that forces the composite workpiece against the numerical control contact to conform the composite workpiece to the as-built shape.

12. The system of claim 11, wherein the computing device is further operable to:
selectively modify the numerical control location based on the comparison of the real-time model to the as-built model; and
selectively extend or retract the numerical control contact to a modified numerical control location.

13. The system of claim 9, wherein the second metrology system comprises a 3D scanner.

14. The system of claim 1, wherein the first metrology system comprises a 3D scanner.

15. A workpiece holder for handling a composite workpiece, wherein the workpiece holder comprises:
a base;
a clamp coupled to the base, wherein the clamp comprises:
a first jaw;
a support member coupled to the first jaw; and
a second jaw coupled to the support member;
a plurality of numerical control contacts located along the first jaw;
a plurality of force control contact located along the second jaw,
wherein:
each one of the plurality of numerical control contacts is selectively extendable and retractable to a numerical control location based on an as-built shape of the composite workpiece;
the second jaw is movable along the support member relative to the first jaw to clamp the composite workpiece between at least one of the numerical control contacts and at least one of the force control contacts;

each one the plurality of force control contacts is selectively extendable and retractable relative to the second jaw to apply a shaping force to the composite workpiece so that the composite workpiece conforms to the as-built shape of the composite workpiece; and with the composite workpiece clamped between the plurality of numerical control contacts and the plurality of force control contacts, the clamp is movable relative to the base to index the composite workpiece in a work cell.

16. The workpiece holder of claim 15, wherein:

the shaping force, applied by each one of the plurality of force control contacts, forces the composite workpiece against the plurality of numerical control contacts to conform the composite workpiece to the as-built shape of the composite workpiece.

17. The workpiece holder of claim 15, wherein:

the numerical control location of each one of the plurality of numerical control contacts corresponds to a coordinate location on a first surface of the composite workpiece represented by an as-built model of the composite workpiece; and the as-built model is representative of the composite workpiece having the as-built shape.

18. The workpiece holder of claim 17, further comprising a computing device that is operable to:

compare a real-time model, generated from real-time measurement data, that is representative of the composite workpiece having a real-time shape as held by the workpiece holder to the as-built model; and modify the numerical control location of at least one of the plurality of numerical control contacts of based on a comparison of the real-time model to the as-built model.

19. The workpiece holder of claim 15, wherein each one of the plurality of numerical control contacts comprises:

a numerical control actuator;

a first vacuum gripper coupled to the numerical control actuator; and a first actuator control unit that controls extension and retraction of the numerical control actuator to locate the first vacuum gripper at the numerical control location.

20. The workpiece holder of claim 15, wherein each one of the plurality of force control contacts comprises:

a force control actuator;

a second vacuum gripper coupled to the force control actuator;

a force sensor that detects a load applied to the force control actuator; and a second actuator control unit that controls extension and retraction of the force control actuator to apply the shaping force to the composite workpiece.

* * * * *